(12) United States Patent
Wilcox, Jr. et al.

(10) Patent No.: US 12,030,769 B2
(45) Date of Patent: Jul. 9, 2024

(54) DISTRIBUTED FUEL SENTRY SYSTEM WITH RELAYED COMMUNICATION

(71) Applicant: Fleet Spartan Inc., Spring, TX (US)

(72) Inventors: Victor Thomas Wilcox, Jr., Tomball, TX (US); Raymond William Benefield, Jr., Spring, TX (US)

(73) Assignee: FLEET SPARTAN INC., Spring, TX (US)

( * ) Notice: Subject to any disclaimer, the term of this patent is extended or adjusted under 35 U.S.C. 154(b) by 116 days.

(21) Appl. No.: 17/540,791

(22) Filed: Dec. 2, 2021

(65) Prior Publication Data

US 2022/0169494 A1 Jun. 2, 2022

Related U.S. Application Data

(60) Provisional application No. 63/120,516, filed on Dec. 2, 2020.

(51) Int. Cl.
*B67D 7/14* (2010.01)
*B67D 7/16* (2010.01)
*B67D 7/22* (2010.01)

(52) U.S. Cl.
CPC ............ *B67D 7/145* (2013.01); *B67D 7/16* (2013.01); *B67D 7/228* (2013.01)

(58) Field of Classification Search
CPC ........... B67D 7/145; B67D 7/228; B67D 7/16
See application file for complete search history.

(56) References Cited

U.S. PATENT DOCUMENTS

| | | | |
|---|---|---|---|
| 8,922,360 B2 * | 12/2014 | Tyler | B60Q 9/00 |
| | | | 340/539.11 |
| 9,493,115 B2 * | 11/2016 | Tyler | B67D 7/04 |
| 9,805,538 B2 | 10/2017 | McQuade et al. | |
| 9,818,120 B2 | 11/2017 | Lesesky | |
| 10,766,758 B2 | 9/2020 | Blyth | |
| 2012/0223830 A1 * | 9/2012 | Tyler | B60Q 5/005 |
| | | | 340/450.2 |

(Continued)

FOREIGN PATENT DOCUMENTS

AU 2012308618 B2 3/2013

*Primary Examiner* — Michael Collins
(74) *Attorney, Agent, or Firm* — Bracewell LLP; Brad Y. Chin

(57) ABSTRACT

A fuel dispensing system includes a fuel tank, a pump that pumps fuel from the fuel tank, and a fuel sentry controlling pumping of the fuel from the fuel tank. The fuel sentry includes a processor, storage storing configuration data, a communication module, and memory operatively coupled to the processor, the storage, and the communication module. The memory includes instructions that, when executed by the processor, cause the processor to: receive, from an external device and via the communication module, a request to perform a fuel dispensing operation from the at least one fuel tank, determine, based on the configuration data stored in the storage, whether a user of the external device is authorized to perform the fuel dispensing operation from the at least one fuel tank, and in response to determining that that user is authorized to perform the fuel dispensing operation from the at least one fuel tank, transmit power to the pump from a power source to allow the user to pump fuel.

21 Claims, 13 Drawing Sheets

(56) References Cited

U.S. PATENT DOCUMENTS

| | | | |
|---|---|---|---|
| 2015/0032558 A1* | 1/2015 | Bonk | G06Q 20/202 |
| | | | 705/21 |
| 2015/0242855 A1* | 8/2015 | Vilnai | G06Q 50/06 |
| | | | 705/44 |
| 2015/0368088 A1* | 12/2015 | Patel | G06Q 30/0226 |
| | | | 700/283 |
| 2018/0053178 A1 | 2/2018 | Shah | |
| 2019/0106317 A1* | 4/2019 | Sahota | G06V 20/62 |

* cited by examiner

DISTRIBUTED FUEL SENTRY SYSTEM WITH RELAYED COMMUNICATION

BACKGROUND

While gas stations have long had secure payment systems for fuel dispensing, there are a number of applications where relatively small tanks in trucks or out at work-sites as well as stationary lager tanks are used to dispense fuel as needed to fleet vehicles and equipment. These tanks generally feature a pump that is powered by the vehicle or other power source to pump the fuel. While these often come with a key to lock the handle, in general, many are unsecured, putting owners at risk for untracked distribution, fuel misappropriation, or outright theft from the tanks. There is also a risk of drivers mistakenly using the wrong kind of fuel from these tanks causing damage to vehicles.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a fuel sentry is provided which comprises: a processor; storage storing configuration data; a communication module; and memory operatively coupled to the processor, the storage, and the communication module, the memory comprising instructions that, when executed by the processor, cause the processor to: receive, from an external device and via the communication module, a request to perform a fuel dispensing operation on the fuel sentry; determine, based on the configuration data stored in the storage, whether a user of the external device is authorized to perform the fuel dispensing operation on the fuel sentry; and in response to determining that that user is authorized to perform the fuel dispensing operation on the fuel sentry, transmit a notification authorizing the user to begin the fuel dispensing operation.

In another embodiment, the configuration data includes identification data for each of a plurality of users who are permitted to perform the fuel dispensing operation on the fuel sentry. In yet another embodiment, the memory further comprises instructions that, when executed by the processor, cause the processor to: receive, from the external device, information indicating a unit to be fueled in the fuel dispensing operation; and transmit, based on the configuration data, a list of tanks that have fuel compatible with the indicated unit, where the configuration data further includes identification data for each of a plurality of units, data indicating a fuel type to be used for each unit, and data indicating a fuel tank capacity for each unit, and where the plurality of units include a plurality of different vehicles or fuel-based work equipment.

In yet another embodiment, the memory further comprises instructions that, when executed by the processor, cause the processor to: transmit, to the external device and during the fuel dispensing operation, first level indicator data indicating a level of fuel remaining in a fuel tank, and second level indicator data indicating an amount of fuel pumped, where the configuration data includes identification data for each of a plurality of users who are permitted to perform the fuel dispensing operation on the fuel sentry, and data indicating, for each permitted user, a maximum authorized amount of fuel that can be pumped by the user during the fuel dispensing operation.

In yet another embodiment, the memory further comprises instructions that, when executed by the processor, cause the processor to: generate a transaction record when the fuel dispensing operation has ended; and deliver the generated transaction record to a server instance deployed on the cloud by directly delivering the transaction record to the server instance when the communication module is in a communication range of a network of the server instance; and archiving the transaction record on the storage; or by storing the transaction record in an undelivered record data table on the storage when the communication module is not in a communication range of a network of the server instance; and relaying the transaction record to one or more external devices when the communication module is communicatively coupled to the one or more external devices via short-range wireless communication for relay to the server instance.

In yet another embodiment, the communication module is configured for short-range wireless communication with the external device, where the memory further comprises instructions that, when executed by the processor, cause the processor to: receive a connection request from the external device when the external device is in a communication range of the communication module; receive updated configuration data from the external device; and replace the configuration data in the storage with the updated configuration data.

In yet another embodiment, a fuel dispensing system is provided which comprises: at least one fuel tank; a first pump that pumps fuel from the at least one fuel tank; and a fuel sentry controlling pumping of the fuel from the fuel tank, the fuel sentry comprising: a processor; storage storing configuration data; a communication module; and memory operatively coupled to the processor, the storage, and the communication module, the memory comprising instructions that, when executed by the processor, cause the processor to: receive, from an external device and via the communication module, a request to perform a fuel dispensing operation from the at least one fuel tank; determine, based on the configuration data stored in the storage, whether a user of the external device is authorized to perform the fuel dispensing operation from the at least one fuel tank; and in response to determining that that user is authorized to perform the fuel dispensing operation from the at least one fuel tank, transmit power to the first pump from a power source to allow the user to pump fuel from the at least one fuel tank.

In yet another embodiment, the at least one fuel tank comprises a first fuel tank holding a first type of fuel, and a second fuel tank holding a second type of fuel, where the system further comprises a second pump, and wherein the first pump pumps fuel from the first fuel tank and the second pump pumps fuel from the second fuel tank, and where the memory further comprises instructions that, when executed by the processor, cause the processor to: determine, based on the configuration data stored in the storage and based on a unit for fueling selected by the user of the external device, a fuel type to be used to perform the fuel dispensing operation for the user; and transmit power to one of the first pump and the second pump to allow the user to pump fuel from one of the first and second fuel tanks that stores the fuel type that is determined to be used to perform the fuel dispensing operation for the user.

In yet another embodiment, the system further comprises a level sensor disposed with the at least one fuel tank to measure a fuel level and provide tracking of how much fuel is available in the fuel tank. In yet another embodiment, the at least one fuel tank, the first pump, and the fuel sentry, are mounted on a mobile transport, or fixedly mounted at a worksite as a stationary unit.

In yet another embodiment, a method for dispensing fuel is provided comprising: receiving, at a fuel sentry and from an external device, a request to perform a fuel dispensing operation; determining, based on configuration data stored in the fuel sentry, whether a user of the external device is authorized to perform the fuel dispensing operation on the fuel sentry; and in response to determining that that user is authorized to perform the fuel dispensing operation on the fuel sentry, transmitting a notification to the external device authorizing the user to begin the fuel dispensing operation.

In yet another embodiment, the configuration data includes identification data for each of a plurality of users who are permitted to perform the fuel dispensing operation on the fuel sentry. In yet another embodiment, the method further comprises: receiving, from the external device, information indicating a unit to be fueled in the fuel dispensing operation; and transmitting, based on the stored configuration data, a list of tanks that have fuel compatible with the indicated unit, where the configuration data further includes identification data for each of a plurality of units, data indicating a fuel type to be used for each unit, and data indicating a fuel tank capacity for each unit.

In yet another embodiment, the method further comprises: generating a transaction record when the fuel dispensing operation has ended; and delivering the generated transaction record to a server instance deployed on the cloud, where delivering the generated transaction record to the server instance comprises: directly delivering the transaction record to the server instance when a communication module of the fuel sentry is in a communication range of a network of the server instance; and archiving the transaction record to a storage of the fuel sentry, or where delivering the generated transaction record to the server instance comprises: storing the transaction record in an undelivered record data table on a storage of the fuel sentry when a communication module of the fuel sentry is not in a communication range of a network of the server instance; and relaying the transaction record to one or more external devices when the communication module is communicatively coupled to the one or more external devices via short-range wireless communication for relay to the server instance.

In yet another embodiment, the transaction record includes GPS location data of the fuel sentry, GPS location data of the external device, identification data of the user, identification data of the fuel sentry, identification data of a fuel tank, identification data of a unit fueled, pumping activity data, and one or more flags for relay communication when the fuel sentry cannot directly deliver the transaction record to the server instance. In yet another embodiment, the method further comprises: receiving, at the fuel sentry, a connection request from the external device when the external device is in a short-range wireless communication range of the fuel sentry; receiving, at the fuel sentry, updated configuration data from the external device; and replacing the configuration data stored in a storage of the fuel sentry with the received updated configuration data.

BRIEF DESCRIPTION OF THE DRAWINGS

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawing figures, which are not to scale, the same reference numerals are used throughout the description and in the drawing figures for components and elements having the same structure, and primed reference numerals are used for components and elements having a similar function and construction to those components and elements having the same unprimed reference numerals.

DETAILED DESCRIPTION

Figure 1:
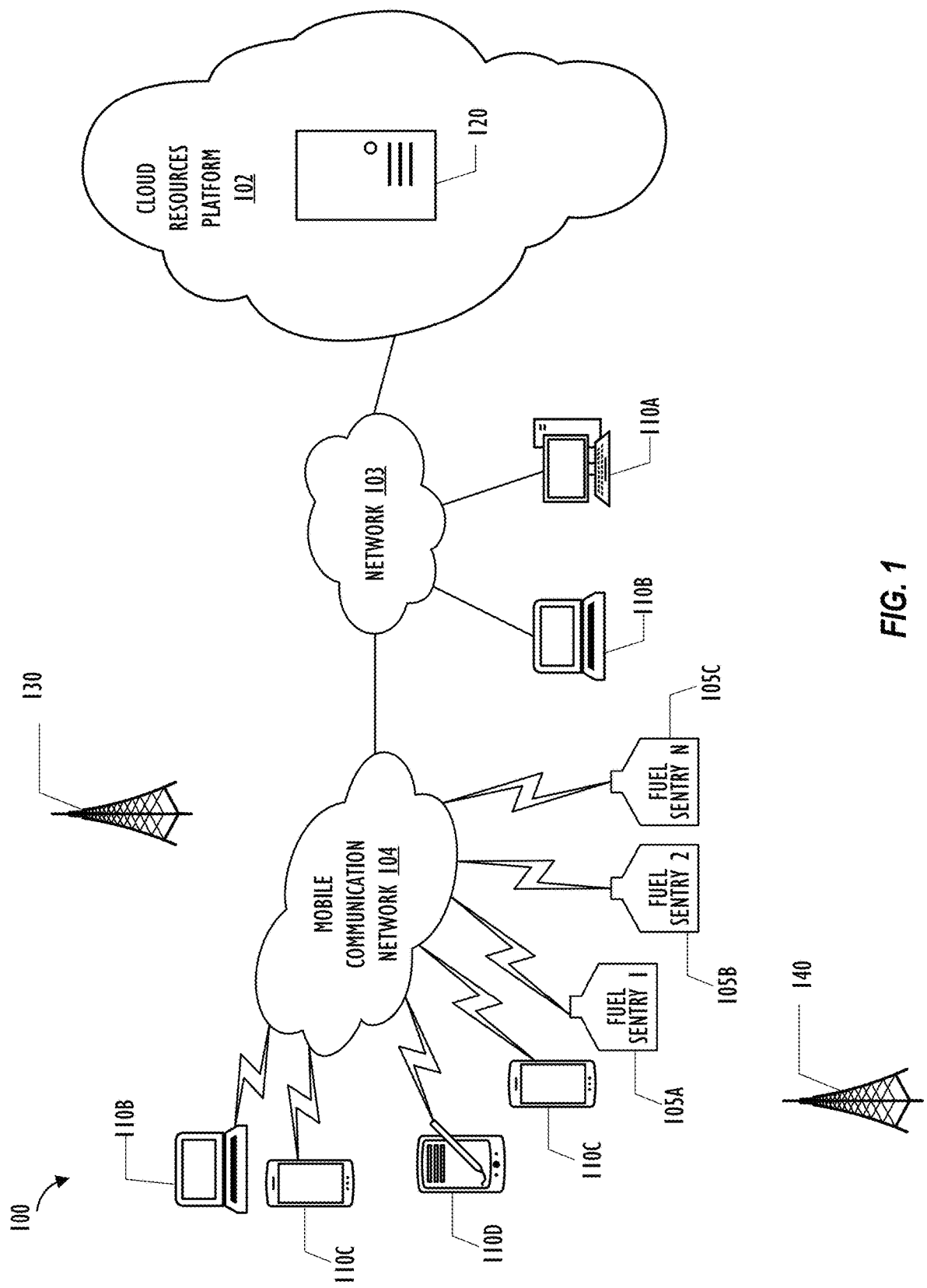
FIG. 1 is a schematic diagram of a distributed fuel sentry system in accordance with one or more embodiments.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to refer ence all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

This disclosure pertains to a distributed fuel sentry system (e.g., fuel security and tracking system) with relayed communication capability and corresponding method. Techniques disclosed herein look to enable an organization to secure its fuel by preventing unauthorized usage and track fuel consumption for particular jobs, vehicles, users, and the like, even when the system is being used in an offline mode (e.g., fuel sentry not connected to the internet or cellular data). The system includes a fuel sentry (e.g., fuel security and tracking device, sentry, sentry device) that controls a fuel dispensing operation (e.g., fuel pumping operation) by activating and deactivating power to a fuel pump based on whether a user is authorized to utilize the fuel sentry for performing the fuel dispensing operation.

The fuel sentry is configured to control and authorize the fuel dispensing operation regardless of whether or not the sentry is online (e.g., connected to a communication network like internet, cellular network, etc.). The sentry is further configured such that when online, it may receive instructions remotely from a server authorizing the fuel dispensing operation at the sentry for a user. The sentry may generate a transaction record corresponding to the fuel dispensing operation, transmit the transaction record to the server (either directly or through relay communication), and archive the transaction, thereby accurately tracking authorized use of the fuel from the fuel tank being handled by the sentry.

The sentry locally stores configuration data (e.g., database of user ID preferences and permissions indicating, for each sentry device in the system, whether a given user ID is authorized to execute a fuel dispensing operation on the sentry; information needed for the given user ID to connect to the given sentry, and activate/deactivate a pump to start/stop the fuel dispensing operation) received from the server to enable use of the sentry at remote sites where communication with the server is not possible. Thus, in the offline mode, a user may utilize an application on a portable electronic device (e.g., smartphone, personal digital assistant, and the like) to connect to the sentry when the sentry is within a communication range (e.g., using Bluetooth, Wifi, near field communication (NFC), and the like). The sentry may determine, based on the configuration data stored therein, whether the user ID associated with the connected portable electronic device (e.g., user device) is authorized to execute the fuel dispensing operation on the sentry, and any associated preferences (e.g., permitted fuel type, permitted fuel tanks, fueling limits, and the like), and authorize use of the sentry for dispensing fuel based on the configuration data.

The sentry application on the portable electronic device may also be configured to connect with the server, when in communication range of the server, to locally store data including an encrypted copy of the (latest, updated) configuration data, transaction record data, and firmware data. The firmware data may be utilized to update firmware on the sentry. In the offline mode, the encrypted version of the configuration data may be transmitted to the connected sentry device, e.g., via Bluetooth, if it is determined that the version of the configuration data on the connected portable electronic device is newer than the version of the configuration data stored on the sentry. And if it determined that the version of the firmware data available on the connected portable electronic device is newer than the firmware version installed on the sentry, the firmware data may also be transmitted to the sentry device, e.g., via Bluetooth in the offline mode to perform a firmware update.

If the fuel dispensing operation is allowed by the sentry based on the configuration data, a transaction record is created for the fuel dispensing operation. After the end of the fuel dispensing operation, and when in the offline mode, the generated transaction record is stored locally on the sentry and flagged as undelivered to the server. The flagged transaction record may also be stored locally on the connected portable electronic device. In some embodiments, the system enables the user to input and store additional information (e.g., job ID corresponding to the fuel dispensing operation, unit ID (e.g. vehicle ID, fuel powered equipment ID) corresponding to the fuel dispensing operation, odometer reading, and the like) in the transaction record.

To enable the fuel dispensing operation functionality of the sentry in the offline mode while accurately tracking and fuel consumption and preventing unauthorized dispensing of fuel from the fuel tank controlled by the fuel sentry, the system is configured for relay communication between the sentry and the server. The system may enable the relay communication by permitting exchange of the transaction record data between sentries and user devices (e.g., portable electronic devices), when they are connected to each other during the fuel dispensing operation or prior to it. A portable electronic device may be configured to locally store one or more flagged transaction records, and when the portable electronic device is in the communication range of the server, the portable electronic device may relay the transaction record data to the server.

FIG. 1 shows distributed fuel sentry system 100 in accordance with one or more embodiments. As shown in FIG. 1, distributed fuel sentry system 100 includes cloud resources platform 102, network 103, mobile communication network 104 (e.g., cellular network, satellite network), one or more fuel sentries 105 (105A-105C) (e.g., sentries, fuel security devices, sentry devices, fuel security and tracking devices), and one or more user devices 110 (e.g., external device). User devices 110 may be computing systems such as desktop computer 110A, or portable electronic devices (or computing systems) such as tablet computer, mobile phone or smartphone 110C, laptop computer (shown as wireless) 110B, personal digital assistant 110D, and/or other electronic devices that can receive and transmit data over a communication network.

Cloud resources platform 102 may be configured as a remote network (e.g., a cloud network) that is communicatively coupled with mobile communication network 104 via network 103, and with one or more fuel sentries 105 and one or more user devices 110 via mobile communication network 104 and/or via network 103. Cloud resources platform 102 may act as a platform that provides additional computing resources and/or functionality to user devices 110 and/or to fuel sentries 105. For example, by utilizing cloud resources platform 102 (and one or more user devices 110), users of user devices 110 may be able to build and execute a distributed fuel security and tracking system in which each fuel sentry 105 is able to track fuel consumption and prevent unauthorized dispensing of fuel from a fuel tank being handled by fuel sentry 105 even when the sentry is operating in an offline mode.

In one embodiment, cloud resources platform 102 includes one or more data centers, where each data center could correspond to a different geographic location. Within a particular data center, a cloud service provider may include at least one server instance 120. Each server instance 120 may be implemented on a physical computing system, such as a single electronic computing device (e.g., a single physical hardware server) or could be in the form of a multi-computing device (e.g., multiple physical hardware servers). Examples of server instances 120 include, but are not limited to, a web server instance (e.g., a unitary Apache® installation), an application server instance (e.g., unitary Java Virtual Machine), and/or a database server instance (e.g., a unitary MySQL® catalog). Apache is a registered trademark of Apache Software Foundation. MySQL is a registered trademark of MySQL AB.

FIG. 1 illustrates that cloud resources platform 102 is coupled to network 103. Network 103 may include one or more computing networks, such as other local area networks (LANs), wide area networks (WANs), the Internet, and/or other remote networks, to transfer data between mobile communication network 104 and cloud resources platform 102, or between user devices 110 and cloud resources platform 102. Each of the computing networks within network 103 may contain wired and/or wireless programmable devices that operate in the electrical and/or optical domain. For example, network 103 may include wireless networks, such as cellular networks in addition to mobile communication network 104. Wireless networks may utilize a variety of protocols and communication techniques (e.g., Global System for Mobile Communications (GSM) based cellular network, wireless fidelity (Wi-Fi) networks, Bluetooth, Near Field Communication (NFC), and/or other suitable radio-based networks as would be appreciated by one of ordinary skill in the art upon viewing this disclosure). Wi-Fi is a registered trademark of the Wi-Fi Alliance. Bluetooth is a registered trademark of Bluetooth Special Interest Group. Network 103 may also employ any number of network communication protocols, such as Transmission Control Protocol (TCP) and Internet Protocol (IP). Although not explicitly shown in FIG. 1, network 103 may include a variety of network devices, such as servers, routers, network switches, and/or other network hardware devices configured to transport data over networks.

Distributed fuel sentry system 100 also includes mobile communication network 104 for use with user devices 110 (e.g., smartphone 110C) and fuel sentries 105. Mobile cellular networks support mobile phones and many other types of mobile devices such as fuel sentries 105, laptops etc. A device such as smartphone 110C or sentry 105 may interact with one or more mobile provider networks as the device moves, typically interacting with a plurality of mobile network towers 130 and 140 for connecting to the mobile communication network 104. Although referred to as a mobile communication network in FIG. 1, a mobile device may interact with towers of more than one provider network, as well as with multiple non-cellular devices such as wireless access points and routers. Mobile communication network 104 is coupled to network 103 to enable communication services and transport data between fuel sentries 105, mobile communication devices 110 (user devices), and/or server instance 120.

Figure 2:
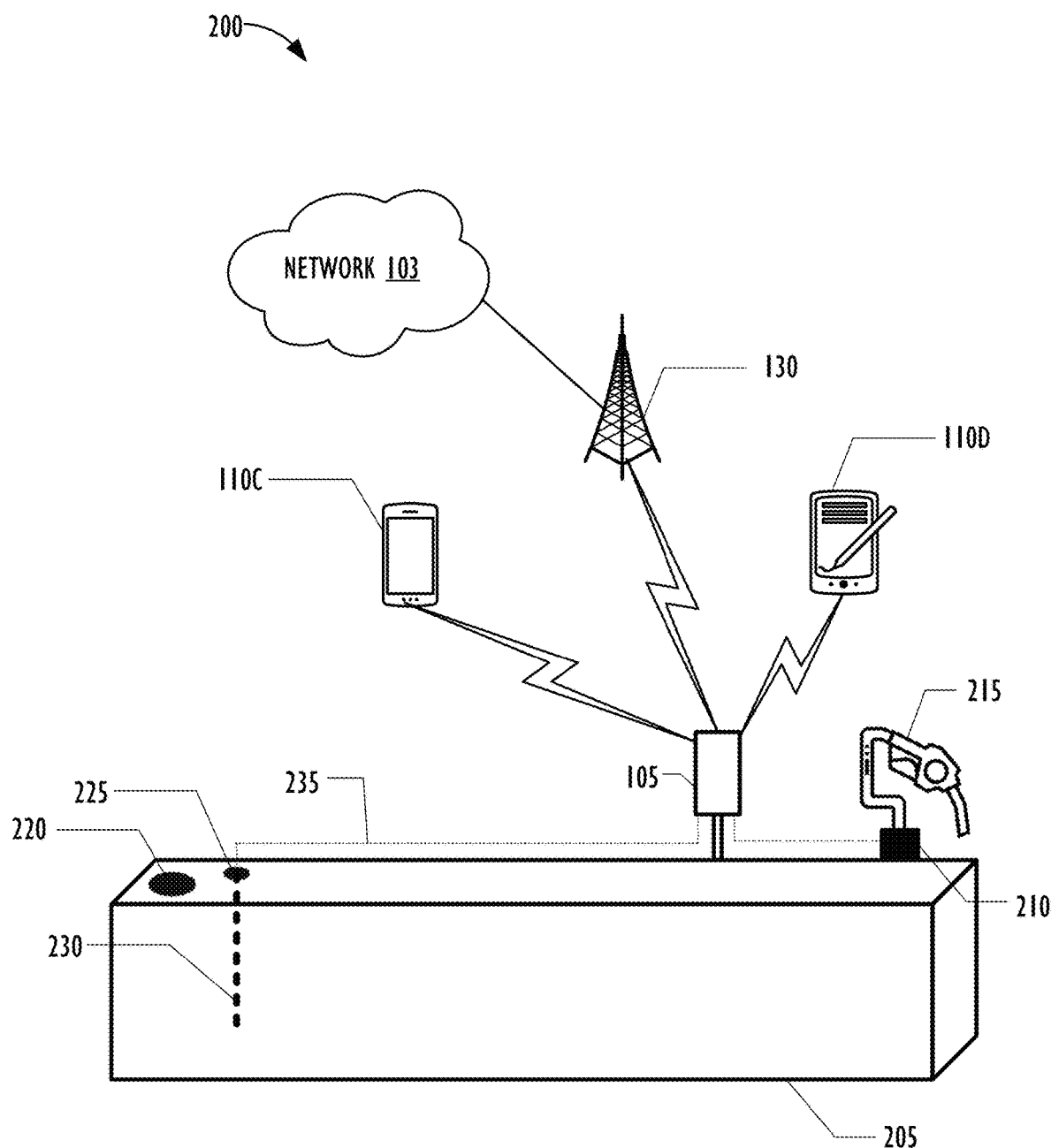
FIG. 2 is a schematic diagram of a fuel dispensing system in accordance with more embodiments.

FIG. 2 is a schematic diagram of fuel dispensing system 200 in accordance with more embodiments. As shown in FIG. 2, fuel dispensing system 200 includes fuel tank 205, fuel pump 210, fuel hose and handle 215, level sensor 230, and fuel sentry 105. Fuel tank 205 may be a relatively small mobile tank mounted on a mobile transport (e.g., truck, trailer, and the like). For example, fuel tank 205 may be a mobile installation on a truck as an L-tank with attached sentry 105 controlling pumping of fuel from the tank. Alternately, fuel tank 205 may be a stationary tank that is fixedly mounted (e.g., on a skid, or other fixed installation) at a work-site or another remote location to store and dispense fuel (e.g., diesel, unleaded gasoline) as needed to fleet vehicles and equipment. Pump 210 to pump fuel from fuel tank 205 may be powered by the mobile transport (e.g., truck, trailer, and the like) on which the fuel tank 205 is mounted or by another power source at the work-site. Pump 210 may be communicatively coupled to and controlled by sentry 105 to prevent untracked distribution, fuel misappropriation, or theft of fuel from fuel tank 205 at the work-site.

Sensor 230 (e.g., level sensor) may be disposed in an interior of tank 205 from bunghole 225 to measure fuel level and provide tracking of how much fuel is available in tank 205. Sensor 230 may also be communicatively coupled to sentry 105 via communication line 235 to provide measured sensor data indicating the amount of fuel left in tank 205 to sentry 105. As illustrated in FIGS. 1 and 2, sentry 105 is configured to communicate via radio communication (e.g., via cell tower 130) with network 103 to communicate with server instance 120. FIG. 2 further shows that sentry 105 is configured for short-range wireless communication with user devices (e.g., smartphone 110C, PDA 110D, etc.) that are within a predetermined range of sentry 105. For example, sentry 105 may be configured to wirelessly communicate with smartphone 110C, or PDA 110D using one or more of Ultra-wideband (UWB), Wi-Fi, ZigBee, Bluetooth, NFC, and the like. Thus, for example, when a user carrying device 110C comes within a predetermined range of fuel dispensing system 200, a fuel sentry application installed on user device 110C is able to connect to sentry 105 via, e.g., Bluetooth, and if the user ID associated with user device 110C is authorized, user device 110C can be operated to perform a fuel dispensing operation from fuel tank 205 even when sentry 105 (and user device 110C) is out of the communication range of tower 130, and as a result, disconnected from network 103 (and from server instance 120; i.e., offline mode).

Although FIG. 2 illustrates fuel dispensing system 200 including one sentry 105 and one fuel tank 205, this may not necessarily be the case. Other embodiments of fuel dispensing system 200 may include more than one sentries 105, with each sentry handling two or more fuel tanks. For example, fuel dispensing system 200 may include one sentry 105 and two fuel tanks 205, one for diesel and one for unleaded gasoline, each tank 205 controlled by sentry 105 and having a corresponding pump 210 and a corresponding fuel hose and handle 215 to dispense fuel.

Sentry 105 may utilize sensor data from sensor 230, and utilize locally stored configuration data to control pump 210, and start and stop the pumping operation. Further, sentry 105 may be configured to detect pump handle 215 being returned based on sensor data (e.g., sensor data sensing electrical impedance) and control pump 210 to stop the pumping operation accordingly. In case sentry 105 controls multiple pumps 210 and tanks 205, sentry 105 may utilize the locally stored configuration data and data regarding the unit (e.g., vehicle) being fueled by the user to prevent the user from pumping the wrong kind of fuel from the wrong fuel tank, thereby preventing damage to vehicles. For example, based on the configuration data, sentry 105 may control pump 210 to prevent a fuel dispensing operation from tank 205 that is known to contain a fuel type that is not compatible for the current user's unit ID (e.g., vehicle, or other fuel based work equipment).

Figure 3:
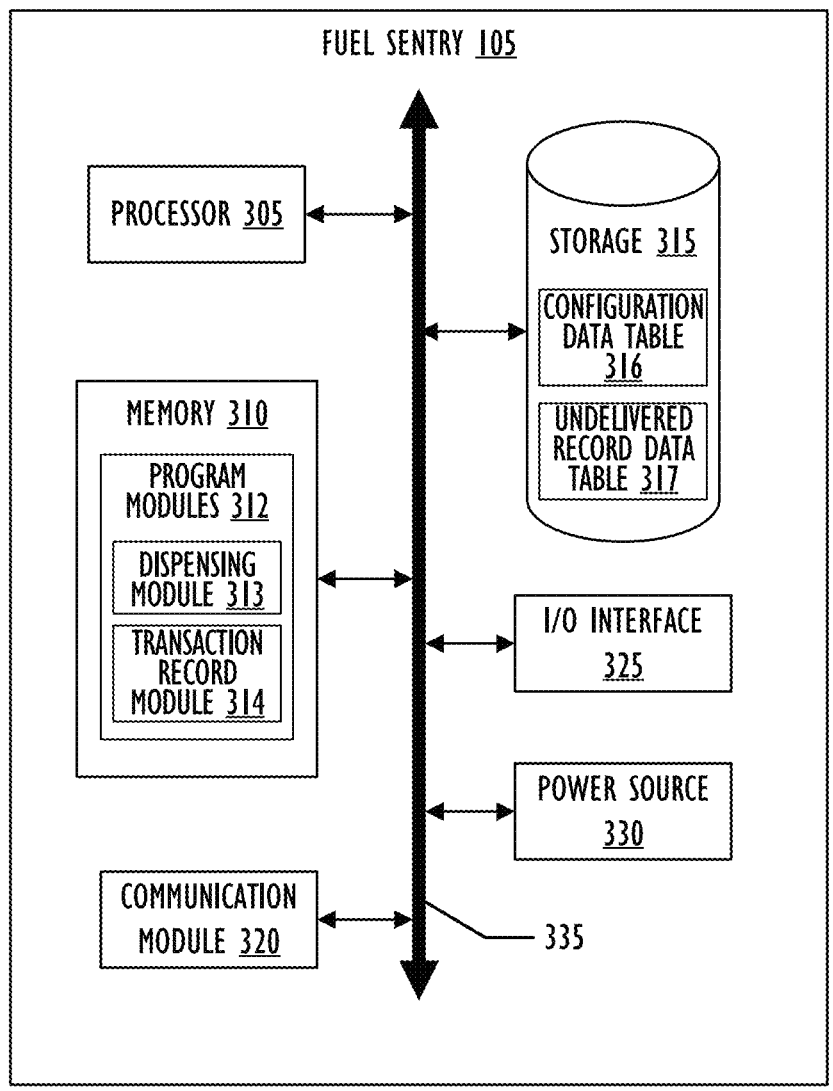
FIG. 3 is a block diagram of a fuel sentry in accordance with one or more embodiments.

FIG. 3 shows a block diagram of fuel sentry 105 in accordance with one or more embodiments. In some embodiments, fuel sentry 105 may be implemented as a programmable logic controller (PLC) with a custom designed printed circuit board. As shown in FIG. 3, fuel sentry 105 may include processor 305, memory 310, storage 315, communication module 320, input/output (I/O) interface 325, and power source 330. Processor 305 may be any suitable processor capable of executing program instructions. Processor 305 may include one or more processors (Central Processing Units (CPUs), or other types of integrated circuits) and/or other type of system on chip (SoC) components to carry out program instructions (e.g., program instructions of program modules 312 including dispensing module 313 and transaction record module 314) to perform the arithmetical, logical, or input/output operations described.

Memory 310 may include non-volatile memory (e.g., flash memory, read-only memory (ROM), programmable read-only memory (PROM), erasable programmable read-only memory (EPROM), electrically erasable programmable read-only memory (EEPROM)), or volatile memory (e.g., random access memory (RAM), static random access memory (SRAM), synchronous dynamic RAM (SDRAM)). Memory 310 may include a non-transitory computer-readable storage medium (e.g., non-transitory program storage device) having program instructions 312 stored thereon. Program instructions 312 (e.g., program modules) may include dispensing module 313 and transaction record module 314 that are executable by processor 305 to cause the functional operations described herein.

Storage 315 may be used to store data (e.g., transaction record data, configuration data). Storage 315 may include any of volatile memory elements (e.g., random access memory (RAM, such as DRAM, SRAM, SDRAM, and the like)), nonvolatile memory elements (e.g., ROM, hard drive, solid state memory, tape, CD-ROM, DVD-ROM and the like), and combinations thereof. Moreover, storage 315 may incorporate electronic, magnetic, optical, and/or other types of storage media. Storage 315 may store configuration data table 316 and undelivered record data table 317. Configuration data table 315 may include encrypted data indicating preferences and permissions for each user authorized to use fuel sentry 105 for performing a fuel dispensing operation. Configuration data 315 may also include data needed by an authorized user to securely connect to sentry 105, and activate/deactivate a pump controlled by sentry 105 to start/stop the fuel dispensing operation. Configuration data 316 may be received by sentry 105 from server instance 120 or from a user device 110 that is in communication with sentry 105.

Dispensing module 313 may be configured to compare a version of the configuration data 316 stored in storage 315 with a version of configuration data stored in server instance 120 or stored locally in a given user device 110. And in response to determining that the version of configuration data stored in server instance 120 or stored locally in the given user device 110 is newer (i.e., configuration data has been updated), dispensing module 313 may be configured to update the configuration data stored in table 316 of storage 315 with the newer version of the data available from server instance 120 and/or user device 110.

Storage 315 may also store undelivered record data 317 in storage 315. Undelivered record data 317 corresponds to data of one or more fuel dispensing transaction records of sentry 105 that have not been delivered to server instance 120 and verified as been delivered. For example, in the offline mode, and based on the configuration data table 316, sentry 105 may authorize one or more fuel dispensing operations and generate corresponding one or more transaction records. However, since connection to server instance 120 is not available in the offline mode, the transaction records are not delivered to the server instance 120. In this case, transaction record module 314 may control to store such undelivered transaction records in undelivered record data table 317 for later delivery and synchronization with server instance 120 when connection to the server becomes available, or for relay the to a user device that sentry 105 may connect to for relay to server instance 120.

Communication module 320 enables sentry device 105 to communicate with one or more user devices 110 via short-range wireless communication, and communicate with server instance 120 via networks 103 and/or 104. For example, communication module 320 may operate on a cellular band and may communicate with or receive a Subscriber Identity Module (SIM) card or other wireless network identifier for communication with server instance 120. Communication module 320 also enables sentry device 105 to perform short-range wireless communication with a user device (e.g., smartphone 110C, PDA 110D, etc.) that is within a predetermined range of sentry 105 to connect for a fuel dispensing operation. For example, communication module 320 may operate using WiFi or Bluetooth to communicate with user device 110 for the fuel dispensing operation. Any number of wireless data communication protocols, techniques, or methodologies can be supported by communication module 320, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

I/O interface 325 can be used to receive and/or output information from sentry 105. For example, I/O interface 325 can include a serial port, a parallel port, a small computer system interface (SCSI), an infrared (IR) interface, a radio frequency (RF) interface, a universal serial bus (USB) interface, one or more sensors (e.g., level sensor 230), and the like. Power source 330 which may provide electrical power to any component of fuel sentry 105 that may require electrical power. In some embodiments, power source 330 may comprise a battery, such as a lithium ion battery, nickel cadmium battery, alkaline battery, or any other suitable type of battery, or any other type of energy storing and/or electricity releasing device. Communication network or fabric 335 may be comprised of one or more continuous (as shown) or discontinuous communication links and be formed as a bus network, a communication network, or a fabric comprised of one or more switching devices (e.g., a cross-bar switch).

Figure 4A:
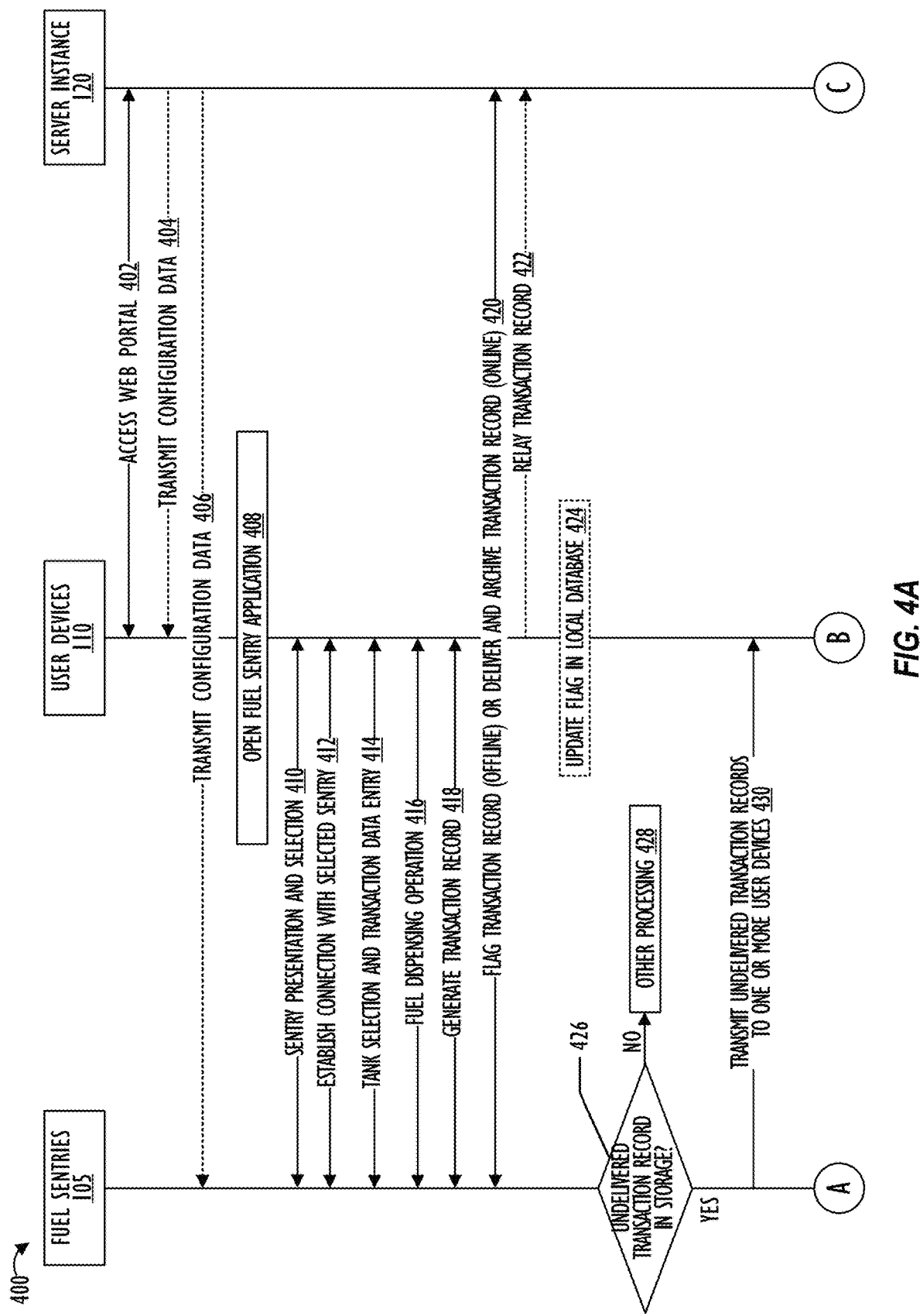
FIGS. 4A-4B are a flow chart of a method of operation of the distributed fuel sentry system with relayed communication in accordance with one or more embodiments.
Figure 4B:
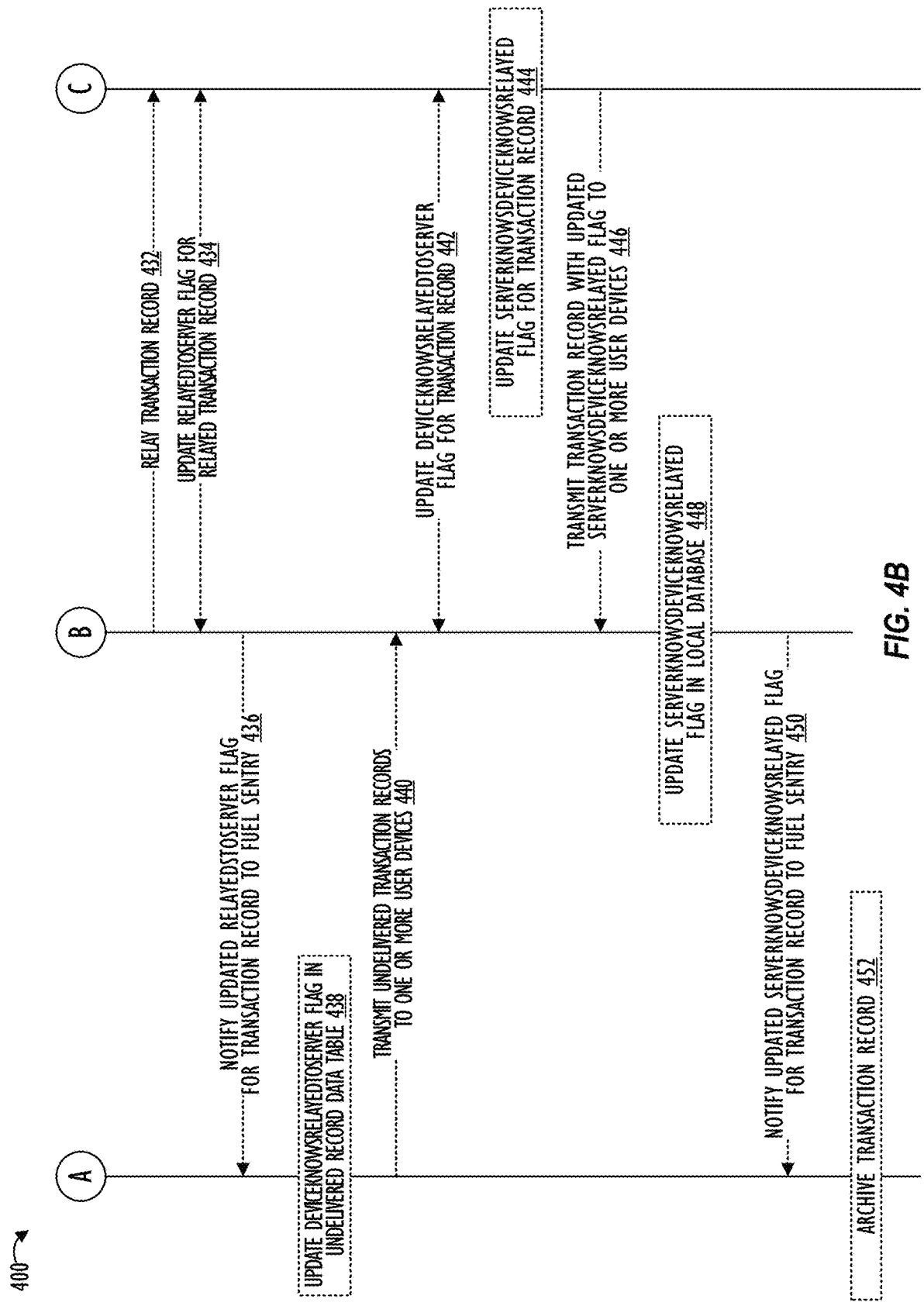
Figure 5A:
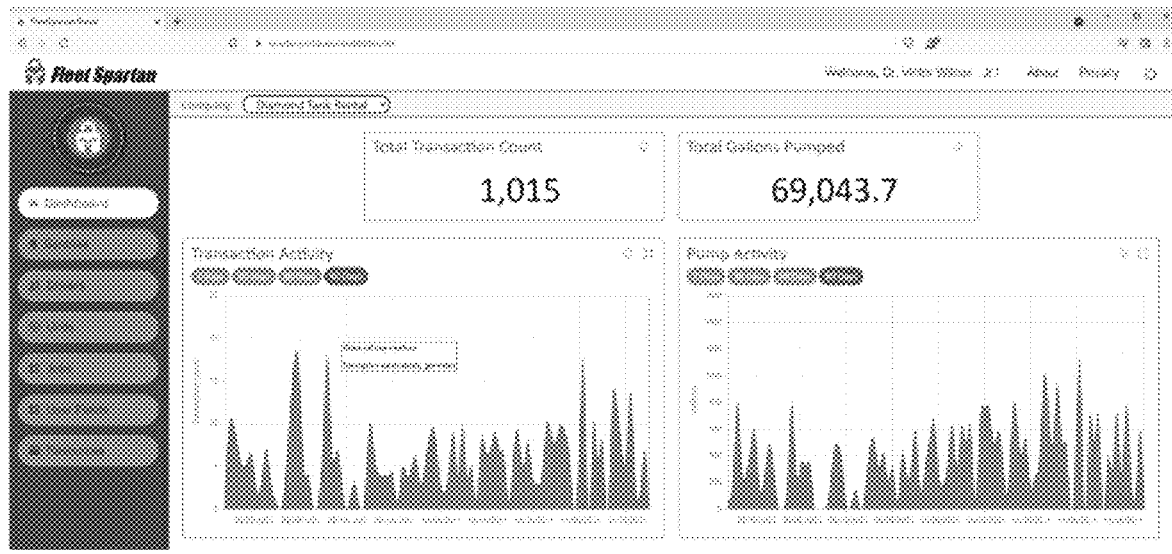
FIG. 5A shows a screen shot of a graphical user interface (GUI) illustrating a company dashboard accessible to an administrative user in accordance with one or more embodiments.
Figure 5B:
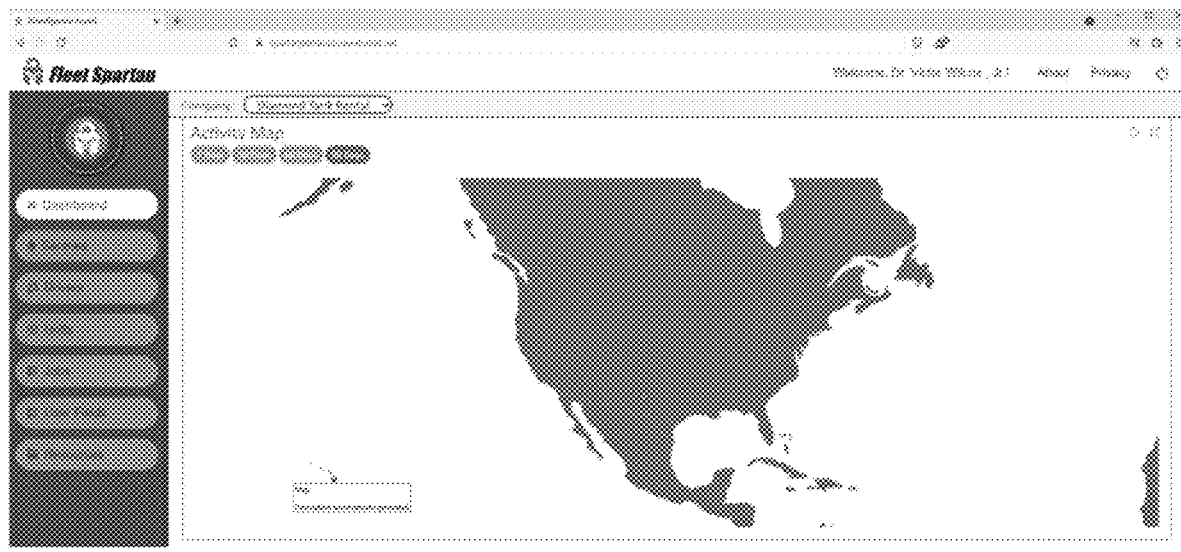
FIG. 5B shows a screen shot of a GUI illustrating the transaction activity on an activity map in accordance with one or more embodiments.
Figure 5C:
FIG. 5C shows a screenshot of a GUI showing recent transactions by all authorized users of the organization across all fuel sentries in accordance with one or more embodiments.
Figure 5D:
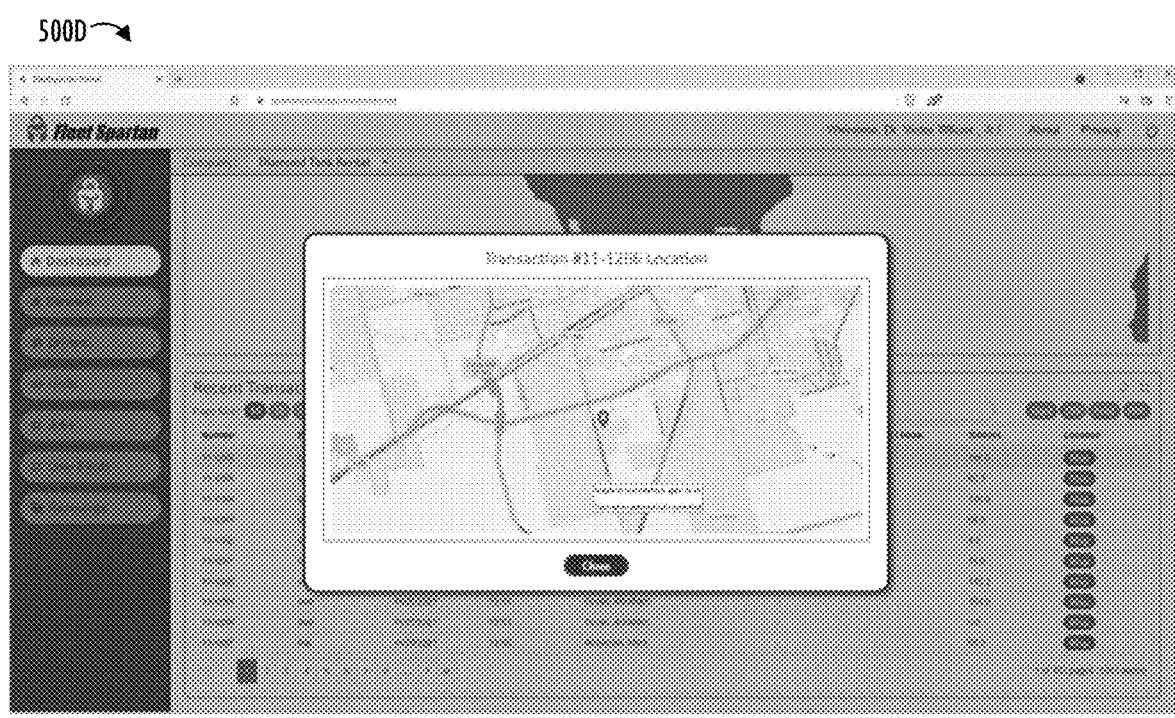
FIG. 5D shows a screenshot of a GUI showing on a map, a transaction location of a particular transaction in accordance with one or more embodiments.
Figure 5E:
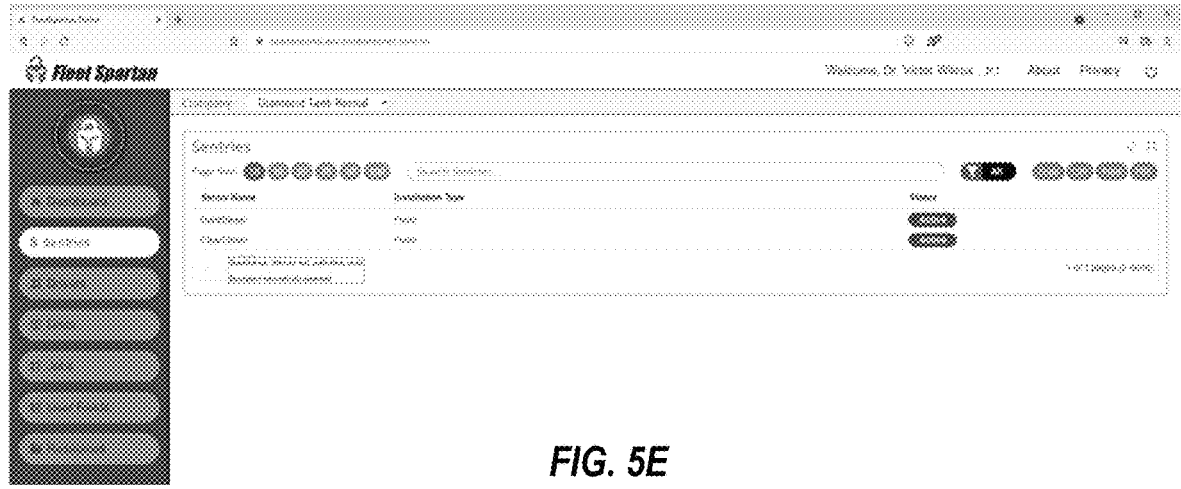
FIG. 5E shows a screenshot of a GUI where an administrative user can browse all fuel sentries that are available to dispense fuel in accordance with one or more embodiments.

FIGS. 4A-4B are a flow chart of method 400 of operation of the distributed fuel sentry system with relayed communication in accordance with one or more embodiments. As shown in FIGS. 4A-4B, method 400 illustrates operations of distributed fuel sentry system and communication performed between one or more fuel sentries 105, one or more user devices 110, and server instance 120. Method 400 begins at block 402 where a user with appropriate privileges (e.g., user with administrative privileges) may access a web portal to browse and edit configuration data and transaction record data associated with a company account. For example, a user utilizing a user device 110 (e.g., device 110A, 110B, etc. in FIG. 1) may access the web portal deployed on server instance 120 to access the data stored on the server. Features of the web portal available to an admin user are illustrated by referring to the screen shots of the web portal in FIGS. 5A-5H. FIG. 5A shows a screen shot of a graphical user interface (GUI) 500A illustrating a company dashboard accessible to an administrative user to view all transaction activity and pumping activity associated with all authorized users of the organization across all fuel sentries. FIG. 5B shows a screen shot of GUI 500B illustrating the transaction activity on an activity map. FIG. 5C shows a screenshot of GUI 500C showing recent transactions by all authorized users of the organization across all fuel sentries. FIG. 5D shows a screenshot of GUI 500D showing on a map, a transaction location of a particular transaction from the list of recent transactions shown in GUI 500C. FIG. 5E shows a screenshot of GUI 500E where an administrative user can browse all fuel sentries that are available for users of the organization to use to dispense fuel.

Figure 5F:
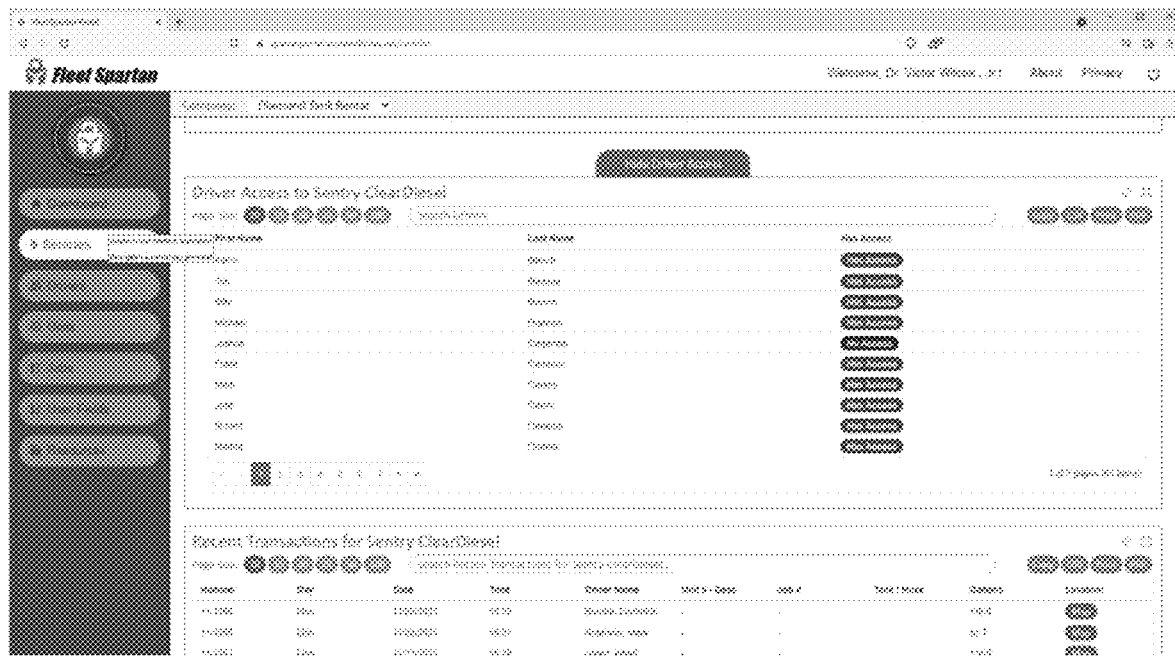
FIG. 5F shows a screenshot of a GUI where an administrative user can configure users for a selected fuel sentry in accordance with one or more embodiments.
Figure 5G:
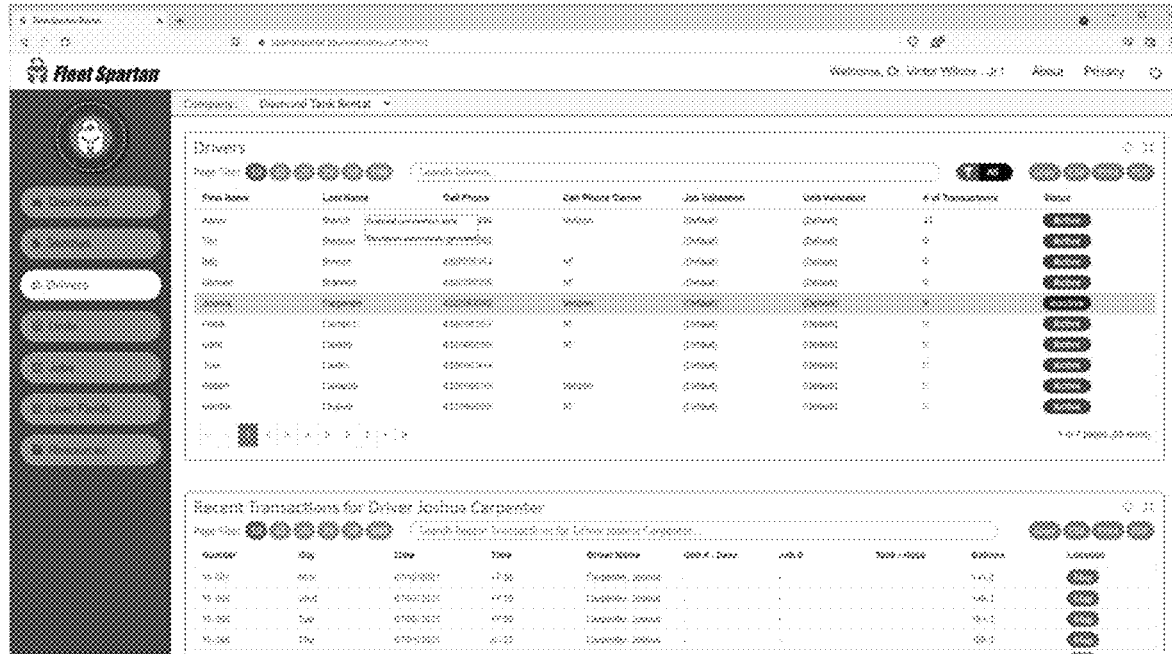
FIG. 5G shows a screenshot of a GUI where an administrative user can configure users for an organization in accordance with one or more embodiments.
Figure 5H:
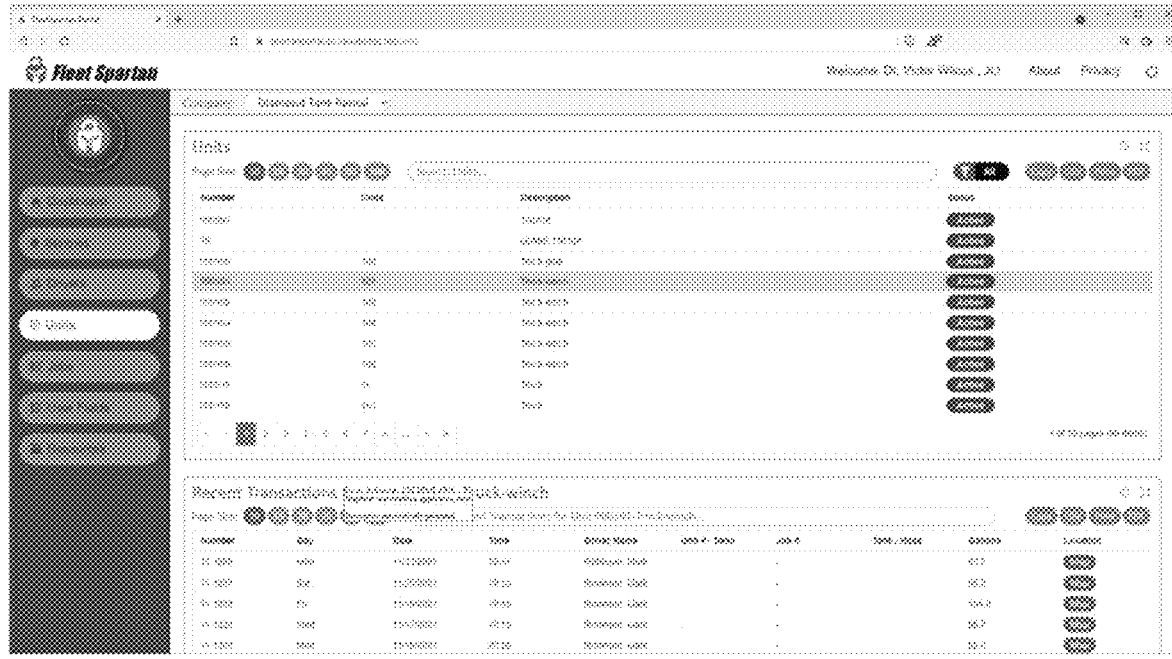
FIG. 5H shows a screenshot of a GUI where an administrative user can configure one or more units used by one or more of the users in accordance with one or more embodiments.

FIG. 5F shows a screenshot of GUI 500F where an administrative user can configure, for a selected fuel sentry out of the available fuel sentries listed on GUI 500E, the users (e.g., drivers) of the organization that have access to the selected fuel sentry. GUI 500F also shows the list of recent transactions by all users on the selected fuel sentry. FIG. 5G shows a screenshot of GUI 500G where an administrative user can configure (e.g., add, delete, edit) users for the company account that are allowed to access the fuel sentries listed on GUI 500E. GUI 500G also shows a list of recent transactions for a selected user. FIG. 5H shows a screenshot of GUI 500F where an administrative user can configure (e.g., add, delete, edit) one or more units (e.g., vehicle, other equipment) for the company account that are be used by one or more of the users of the organization listed on GUI 500G. GUI 500H also shows a list of recent transactions for a selected unit. At GUI 500H, the administrative user can also configure a fuel type and a fuel capacity for a selected unit.

Returning to method 400 of FIGS. 4A-4B, at block 404, server instance 120 may transmit configuration data to one or more user devices 110, and at block 406, server instance 120 may transmit configuration data to one or more fuel sentries 105. As explained previously, the configuration data may be data indicating which users are authorized to use which fuel sentries belonging to a particular organization and preferences and permissions for each user for performing the fuel dispensing operation. The configuration data transmitted at blocks 404 and 406 may be based on data generated at the web portal by operations of the administrative user at GUI 500F to configure, for each fuel sentry, users that have access to the fuel sentry, operations of the administrative user at GUI 500G to configure users of the organization account, and operations of the administrative user at GUI 500H to configure units (e.g., vehicles, other fuel based equipment) of the organization account, and configure fuel type and capacity for each unit. Server instance 120 may transmit the configuration data to one or more user devices 110 and one or more fuel sentries 105 that are in a communication range of server instance 120.

Figure 6A:
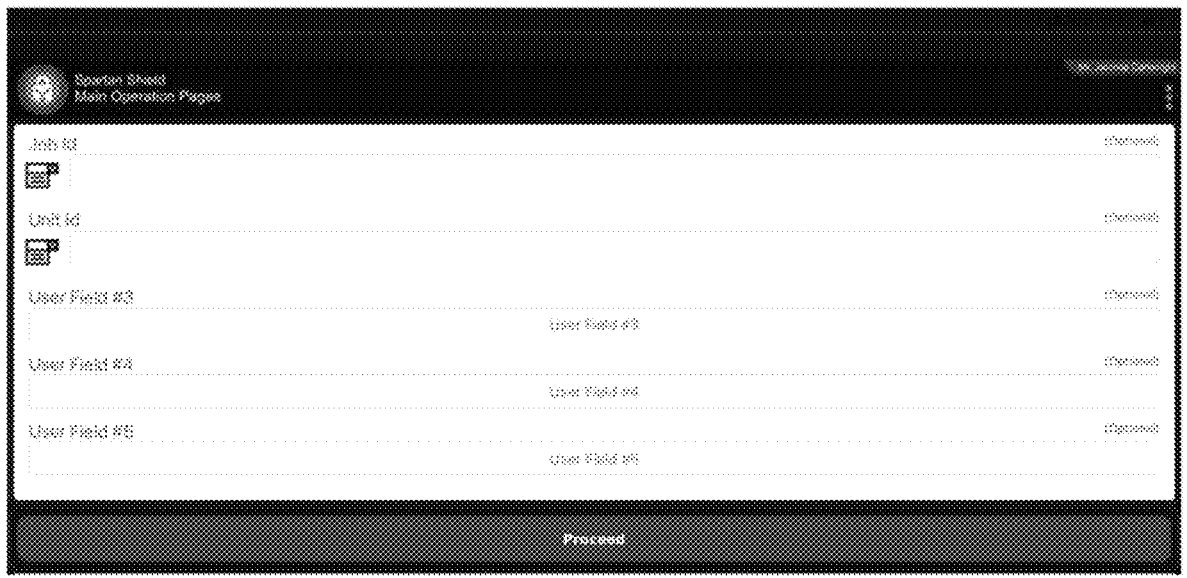
FIGS. 6A-6F show different screen shots of GUIs of a fuel sentry application on a user device that is used to conduct a fuel dispensing operation in accordance with one or more disclosed embodiments.

Method 400 then proceeds to block 408 where a user of one of the user devices 110 attempts to perform a fuel dispensing operation for a selected unit (e.g., vehicle, other fuel-based equipment) at one of the fuel sentries 105. For example, a user (e.g., driver) may park a vehicle next to a fuel sentry 105 at a worksite. The user may then use a portable electronic device (e.g., smartphone) 110 to access a fuel sentry application installed on the user device 110. When the user first uses the application on user device 110, the user may undergo a registration process (e.g., submit name, phone number, and other identification details), and then an administrative user of the organization may utilize the web portal on server instance 120 to review the user, and determine whether to authorize the user to use one or more fuel sentries of the organization. From then, the user can simply unlock user device 110 to login to the fuel sentry application installed on the user device 110. Operations at block 408 are illustrated by referring to FIG. 6A showing a screen shot of GUI 600A of the fuel sentry application installed on user device 110. As shown in FIG. 6A, upon opening and logging in to the fuel sentry application on user device 110, the user can attempt to start a new transaction record by inputting and storing information corresponding to a fuel dispensing operation (e.g., select a job ID from a list of job IDs, select a unit ID from a list of unit IDs (e.g. vehicle ID, fuel powered equipment ID), and the like).

Figure 6B:
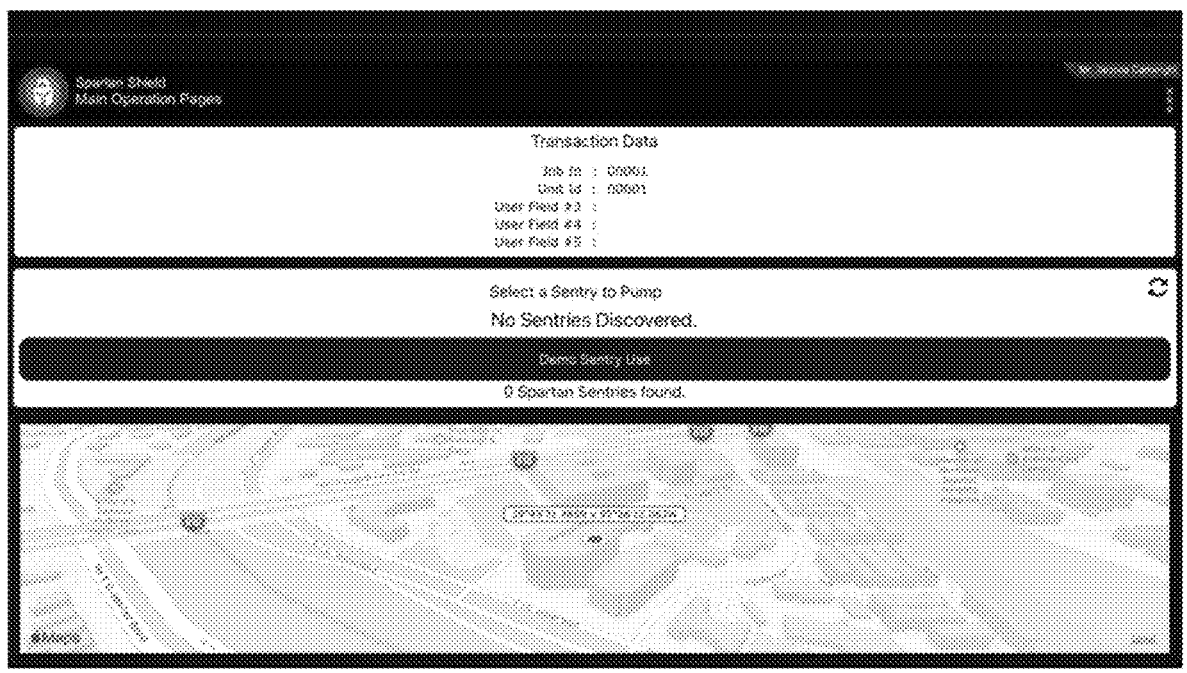

Method 400 then proceeds to block 410 where dispensing module 313 of fuel sentry 105 that is within a communication range (e.g., via Bluetooth) of the user device may present the sentry 105 as being selectable for dispensing fuel on a GUI in the fuel sentry application installed on user device 110. Operations at block 410 are illustrated by referring to FIG. 6B showing a screen shot of GUI 600B of the fuel sentry application installed on user device 110. As shown in FIG. 6B, after inputting and storing information corresponding to a new fuel dispensing operation (e.g., job ID, unit ID), GUI 600B presents a sentry selection screen to the user to select an available sentry on a map. At block 410, dispensing module 313 of sentry 105 in proximity of device 110 may determine based on configuration data stored in configuration data table 316 whether the user logged into device 110 is an authorized user who is allowed to dispense fuel from sentry 105, and based on the determination dispensing module 313 may control to present the sentry 105 to the fuel sentry application of user device 110 as being a sentry that is selectable by the user for dispensing fuel, and the sentry application on the user device may thus present on a map, (one or more) selectable sentries 105 that are in close proximity to the user device 110 and that are selectable (based on the configuration data on the sentry) by the user of device 110 for dispensing fuel.

At block 410, communication module 320 of selectable fuel sentry 105 may be configured to communicate with user device 110 via short-range wireless communication (e.g., Bluetooth) and GUI 600B may show fuel sentry 105 on the sentry selection screen as being selectable only if sentry 105 is in communication range via short-range wireless communication. Alternately, or in addition, communication module 320 of selectable fuel sentry 105 may be configured to communicate with user device 110 via radio communication (e.g., cellular data) and GUI 600B may show selectable fuel sentry 105 on the sentry selection screen even if sentry 105 is not in a local range relative to the user device 110 of the user, as long as both sentry 105 and user device 110 are in a communication range for the radio communication. In the example screen shot of GUI 600B, since no sentries are found within a proximal range from user device (and/or since no proximal sentries are selectable by the user of the device), the sentry selection screen presents no sentries as being selectable to pump by the user. Notably, method 400 controls operations of the distributed fuel sentry system and communication between fuel sentry 105, user device 110, and server instance 120, both in an online mode where fuel sentry 105 (and user device 110) is within the communication range for radio communication (e.g., via cellular network 104) with server instance 120, and in an offline mode where fuel sentry 105 is not within the communication range for radio communication (e.g., via cellular network 104) with server instance 120.

Figure 6C:
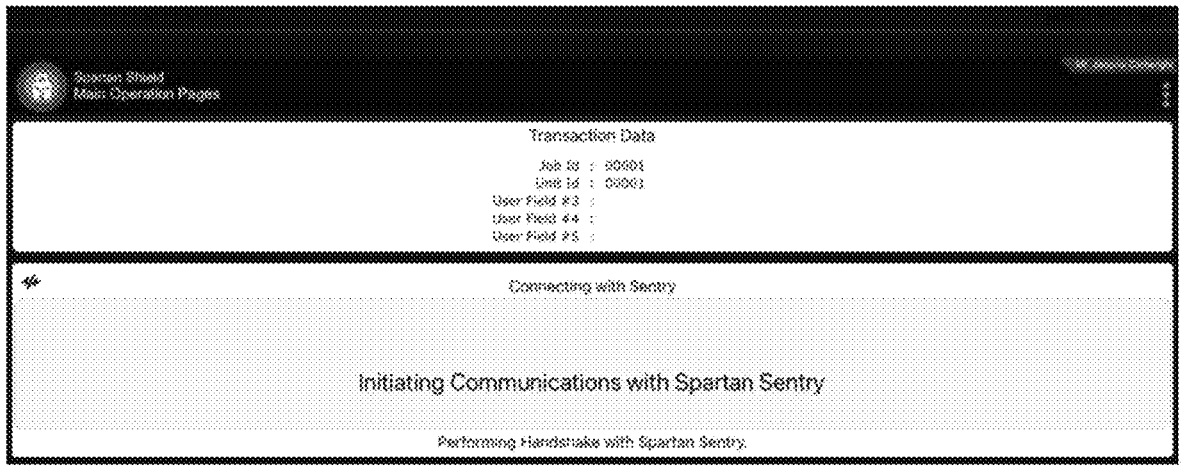

After the user has selects a fuel sentry 105 listed as a selectable fuel sentry on the sentry selection screen of GUI 600B, method 400 proceeds to block 412 where the user device 110 establishes a connection with the selected sentry 105. Operations at block 412 are illustrated by referring to FIG. 6C showing a screen shot of GUI 600C of the fuel sentry application installed on user device 110. As shown in FIG. 6C, after the user selects an available sentry on GUI 600B, GUI 600C presents a sentry connection screen to the user indicating the application is connecting, e.g., via Bluetooth, to the selected sentry and going through handoff protocol. Upon establishing the connection at block 412, program modules 312 of the selected sentry 105 control to perform background processing while the fuel dispensing operation with user device 110 is underway. For example, at block 412, transaction record module 314 determines whether there are any transaction records stored in undelivered record data table 317 that are not yet delivered to server instance 120, and transmits the transaction records stored in undelivered record data table 317 to the connected user device 110 for local storage. Note that when fuel sentry 105 is online, transaction records may be directly delivered and synced with the database on server instance 120, and archieved to storage 315 of fuel sentry 105 without storing the transaction records in undelivered record data table 317.

At block 412, for any transaction record stored in undelivered record data table 317, transaction record module 314 may also control to receive from the connected user device 110, an updated copy of the transaction record where one or more fields of the record have been updated and stored locally on user device 110. For example, when operating in the offline mode, during relay data communication between fuel sentry 105 and server instance 120, a delivery notification flag of a transaction record delivered to the server may be updated/synced and the updated copy of the record may be stored locally on the user device 110. When such a user device 110 with the locally updated and stored copy of the transaction record connects to the fuel sentry 105, the transaction record module 314 of fuel sentry 105 may control to update the transaction record stored in undelivered record data table 317 to reflect the updated delivery notification flag of the record. This results in transaction record module 314 of fuel sentry 105 archiving the transaction record and removing the record from the undelivered record data table 317 and stopping transmitting the transaction record to any user device 110 that subsequently connects to fuel sentry 105. Further, at block 412, dispensing module 313 of selected fuel sentry 105 may also control (e.g., when operating in offline mode) to update the configuration data stored in configuration data table 316 based on availability of any updates to the configuration data stored locally on connected user device 110 (e.g., updated list of users with access privileges to selected fuel sentry 105). Still further, at block 412, if sentry 105 is at a fixed location without data (or has been away from data connected areas for a long time; i.e., offline mode), program modules 312 may control to download and update firmware of fuel sentry 105 based on availability of such an update from connected user device 110.

Figure 6D:
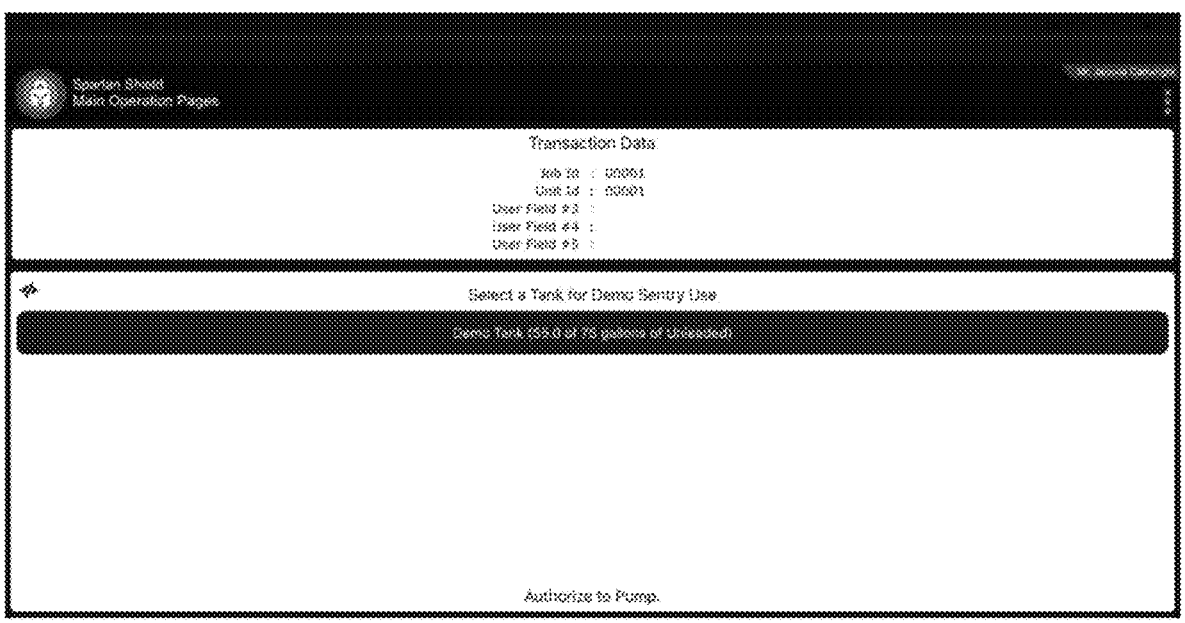

Next, at block 414, after the selected sentry 105 is connected to the user device 110, method 400 performs a tank selection operation and a transaction data entry operation. At block 414, dispensing module 313 of selected sentry 105 may control to display on the user device 110 a list of zero or more fuel tanks (e.g., tank 205) that have fuel compatible with the selected unit (e.g., vehicle selected at block 408 by user of device 110). FIG. 6D shows a screen shot of GUI 600D of the fuel sentry application installed on user device 110. As shown in FIG. 6D, after the operations of block 412 where the selected sentry connection screen 600C is presented on user device 110 and the background processing is performed by program modules 312 of selected sentry 105, at block 414, GUI 600D presents a list of tanks controlled by the selected sentry 105 that have fuel compatible with the selected unit (e.g., vehicle). For example, at block 414, dispensing module 313 of selected sentry 105 determines based on the configuration data stored in table 316 whether one or more tanks being handled by selected sentry 105 carries fuel that is compatible with the fuel needed by the unit selected by the user of user device 110 at GUI 600A. In the example embodiment shown in FIG. 2, a sentry 105 is illustrated as handling one tank 210. However, in other embodiments a sentry 105 may handle two or more tanks, each carrying a different type of fuel (e.g., one tank carrying street diesel, one tank carrying off-road diesel, and the like). Based on the configuration data, dispending module 313 may determine the correct fuel type needed for the selected unit associated with the current fuel dispensing operation, and only present for selection on GUI 600D, one or more tanks of selected sentry 105 whose fuel is compatible with the selected unit (and that have fuel remaining in the tank, based on data from line sensor 230 or based on past transaction data). This prevents the user from accidentally putting the wrong fuel into a vehicle thereby preventing damage and/or large environmental fines. If, at block 414, dispensing module 313 determines that no tanks have compatible fuel, dispensing module 313 will present this information to the user on GUI 600D and disconnect from user device 110, ending the connection established at block 412. If, on the other hand, dispensing module 313 determines that a tank having compatible fuel is available, dispensing module 313 will present this information to the user on GUI 600D and accept as input, a selection of an available tank from the user.

Figure 6E:
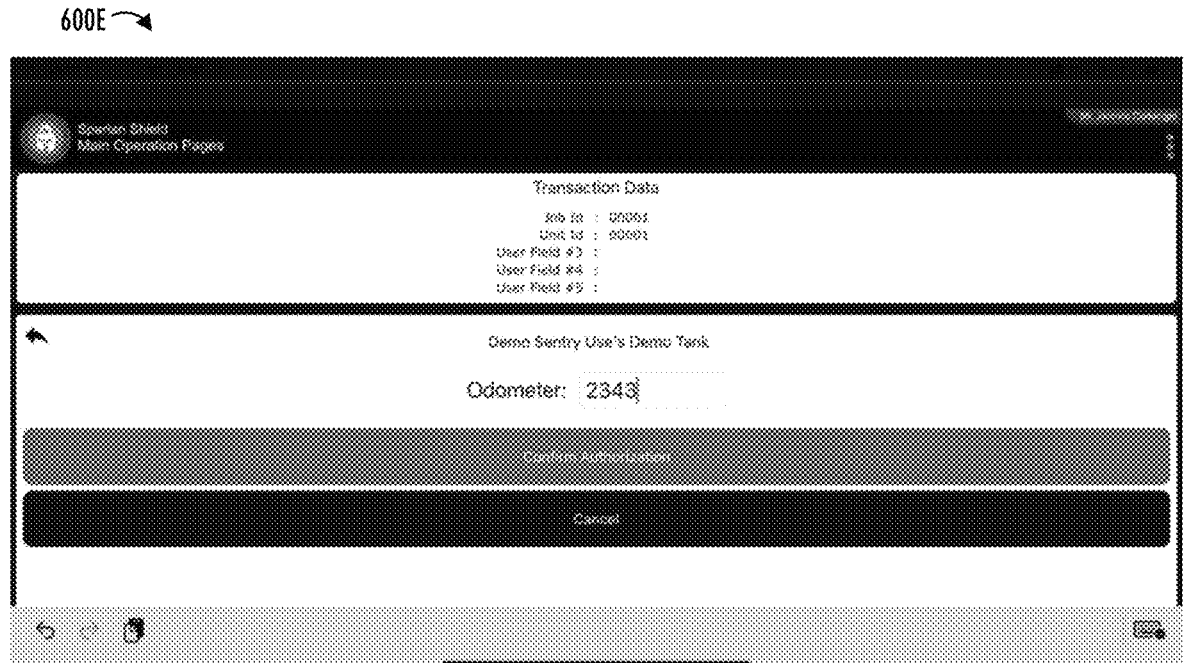

Next, at block 414, dispensing module 313 may notify the user and accept as input, additional information (e.g., odometer reading, unit hours) related to the transaction. FIG. 6E shows a screen shot of GUI 600E of the fuel sentry application installed on user device 110. As shown in FIG. 6E, after an available tank of a selected sentry 105 is selected on GUI 600D, at block 414, dispensing module 313 controls (via processor 305) to present GUI 600E to the user on device 110 to prompt the user to input additional transaction data (e.g., vehicle odometer reading, hours of operation of fuel based equipment since previous fueling, etc.) related to the transaction. Such transaction data may be collected and reported to the server instance 120 as part of the transaction record for validation and job costing/reporting.

Figure 6F:
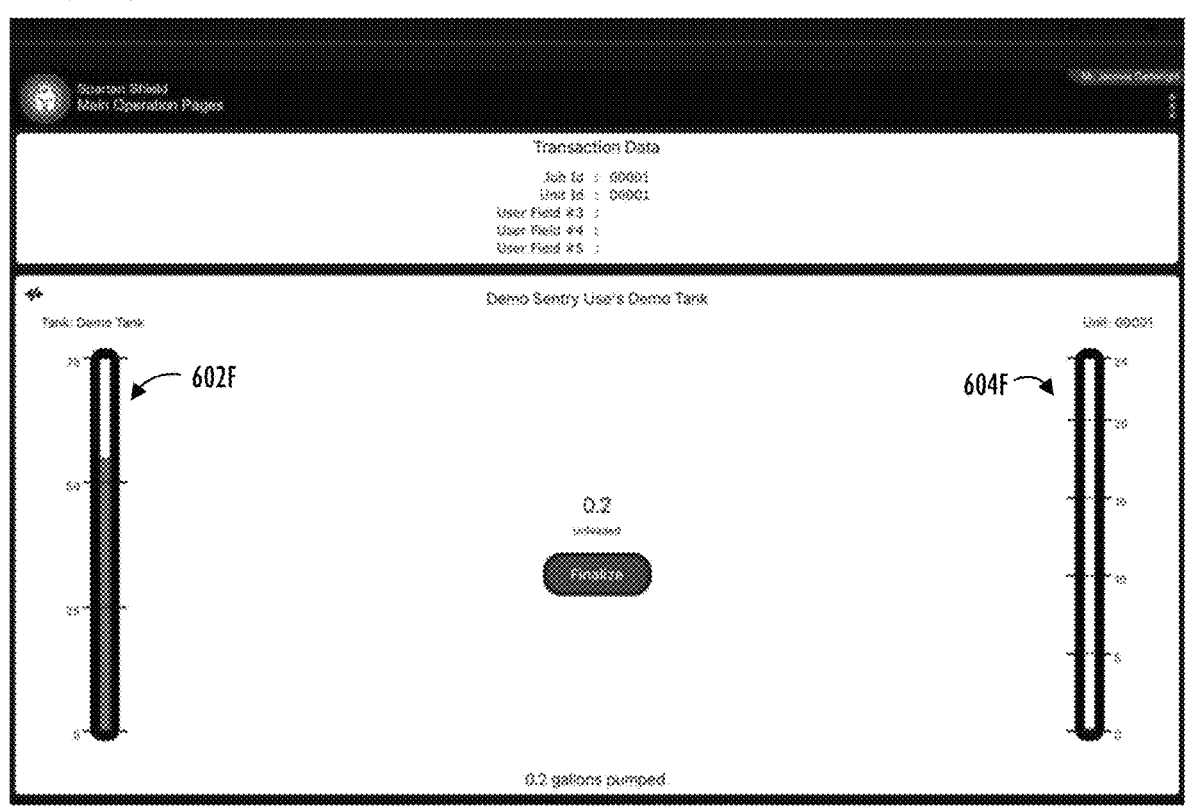

Next, at block 416, dispensing module 313 and processor 305 control one or more components of selected fuel sentry 105 (e.g., power source 330 and I/O interface 325 in FIG. 3, pump 210 in FIG. 2) to allow power to the pump and conduct a fuel dispensing operation based on an operation of the user on user device 110. FIG. 6F shows a screen shot of GUI 600F of the fuel sentry application installed on user device 110. As shown in FIG. 6F, after inputting the additional transaction data (e.g., odometer data) related to the transaction on GUI 600E, dispensing module 313 controls to present to the user a fuel dispensing operation screen on GUI 600F of user device 110. During the fuel dispensing operation, based on the configuration data stored in table 317, dispensing module 313 may determine fuel capacity for the unit being refueled (or a maximum authorized amount fuel that can be pumped at a time by the associated user ID or unit ID) and limit pumping based on the determined fuel capacity or authorized amount. Further, as shown in FIG. 6F, based on sensor data from, e.g., line sensor 230 of the fuel tank, or based on data from a third party tank level monitoring service, dispensing module 313 may control to present to the user on the fuel dispensing operation screen on GUI 600F of user device 110, level indicator 602F indicating a level of fuel remaining in fuel tank. Alternately, or in addition, dispensing module 313 may control to present the level indicator 602F indicating the level of fuel remaining in fuel tank based on tracking data representing past fuel dispensing transactions carried out by fuel sentry 105 using the fuel tank. Dispensing module 313 may further control to present level indicator 604F indicating the level of fuel pumped from the fuel tank into the unit (e.g., vehicle) associated with the user device. Thus, during the pumping operation, level indicator 602F of the fuel tank handled by selected sentry 105 will decrease, and the amount pumped into the vehicle indicated by level indicator 604F will increase. The fuel dispensing operation at block 416 ends based on user operation on GUI 600F or based on dispensing module 313 determining that the maximum capacity or maximum authorized limit has been reached, at which time dispensing module 313 controls pump to automatically cease pumping. Thus, based on the configuration data fuel sentry 105 will only activate the pump for units (e.g., vehicle) with compatible fuel and can limit the quantity dispensed to what the vehicle/unit can hold.

Method 400 then proceeds to block 418 where a transaction record is generated for the fuel dispensing operation concluded at block 416. Thus, on GUI 600E, once the user specifies their odometer and/or unit hours used, they confirm their activation, and the pump turns on allowing them to dispense fuel. The fuel sentry application installed on user device 110 allows the user to monitor the pumping process. If the user chooses, the user can deactivate the pumping with an option on GUI 600F or by hanging up the pump handle, causing pumping to cease, and a transaction record being generated for user device 110 and for sentry 105.

Both fuel sentry 105 and user device 110 acquire GPS location and report the location, along with pumping activity data, job, unit and other fields, and timestamp as part of the transaction record to the server instance 120. More specifically, the transaction record may include data corresponding to a plurality of database fields for a tank transaction (e.g., fuel dispensing operation, fuel dispensing transation, pump transaction). In some embodiments, the transaction record includes data corresponding to the following fields:

TransactionID—A unique integer that increments by one for each transaction;

CompanyID—A unique integer for each company or organization account (e.g., administrator account whose information is shown on GUIs 500A-500H of FIGS. 5A-5H);

CompanyAccountID—A unique account ID. One administrator account per company may be created. Alternately, multiple administrator accounts per company may be created depending on need;

TransactionUID—Unique ID generated for a transaction record;

TankControllerID—Unique ID for the sentry on which the transaction occurred;

TankControllerUID—Unique ID for the sentry (for validation);

ControllerTransactionID—Unique ID for the transaction on that controller. This is not globally unique, but appended to the ID for the sentry it is unique;

TankID—Unique ID for the tank used in the transaction;

TankNumber—Number of the tank on the sentry used in the transaction, e.g., Tank #1, Tank #2, Tank #3, Tank #4, and so on;

TankUID—Unique ID of the tank used in the transaction;

TransactionDateTime—Date and Time with offset from UTC for the transaction;

DriverID—Unique ID for the driver who executed the transaction;

UnitID—Unit (e.g., vehicle) selected for the transaction;

JobID—the job selected for the transaction;

Gallons—Number of gallons pumped in the transaction;

PricePerGallon—This can be from a set fixed price, the average of all gas pumped into tank, or the price of the current fuel being used;

PreTankLevel—The level of the tank prior to the transaction (estimated or measured);

PostTankLevel—The level of the tank after the transaction (estimated or measured);

Odometer—The odometer reading entered by the driver prior to starting fueling;

Longitude—The longitude measured by the sentry device or known longitude if sentry device has a fixed location;

Latitude—The latitude measured by the sentry device or known latitude if sentry device has a fixed location;

PhoneLongitude—The longitude measured by the user device (e.g., smartphone) at the time of the transaction;

PhoneLatitude—The latitude measured by the user device (e.g., smartphone) at the time of the transaction;

Relay Status—This flag is always 'R' on server, though on user devices, it could be 'U' (unrelayed), 'R' (relayed), or 'V' (verified);

RelayedToServer—This flag is always 'Y' on server instance database, but on user devices, 'Y' if device got in data range long enough to send it or have had phones connect to which it posted the transaction;

DeviceKnowsRelayedToServer—This flag tracks if sentry has confirmed that it knows that the transaction has been delievered to the server instance. Until this flag becomes 'Y' (yes), user devices that connect to the sentry will keep receiving data with the transaction record having the 'N' value for this flag. Once the sentry is notified that the transaction record in question has been delivered to the server, this flag turns to 'Y';

ServerKnowsDeviceKnowsRelayed—This flag is updated to 'Y' after server instance is notified that sentry knows that the transaction record in question has been delievered to the server instance.

AddedTimestamp—The timestamp with offset from UTC of when transaction entered the database.

Method 400 then proceeds to block 420 where, if connection to server instance 120 is not available, transaction record module 314 of selected sentry 105 flags the transaction record generated at block 418 as undelivered to server, and stores the flagged transaction record locally in undelivered record data table 317 of storage 315, and if connection to server instance 120 is available, transaction record module 314 of selected sentry 105 delivers the transaction record generated at block 418 to server instance 120 to store the transaction record on the database of the server instance 120, and archive the record in storage 315. As mentioned previously, the distributed fuel sentry system is configured to perform fuel dispensing operations both in the online mode where fuel sentry 105 (and user device 110) is within the communication range for radio communication (e.g., via cellular network 104) with server instance 120, and in the offline mode where fuel sentry 105 is not within the communication range for radio communication (e.g., via cellular network 104) with server instance 120.

At block 420, if sentry 105 is within a communication range of server instance 120 (online mode), the transaction record generated at block 418 is delivered to server instance 120, and transaction record module 314 of selected sentry 105 controls to archive the local copy of the transaction record to storage 315, to thereby sync the transaction record to the server and accurately track authorized use of the fuel from the fuel tank being handled by selected sentry 105. Thus, for example, if internet or cellular data access is available to communication module 320 of sentry 105 when the transaction record is generated, transaction record module 314 will control to deliver the generated transaction record to the server instance 120 via, e.g., a webAPI or SignalR, and the transaction record will be stored on a transaction table on a storage device of server instance 120 (or, in case of data error, it may be stored in an orphan table on server instance 120 for forensic analysis). And since the transaction record was directly delivered from sentry 105 to server instance 120, sentry 105 can simply archive the transaction and give it no further consideration.

At block 420, if sentry 105 is not within the communication range of server instance 120 (offline mode), the transaction record generated at block 418 is flagged (e.g., update RelayStatus flag) and the flagged record may be stored locally in undelivered record data table 317 of storage 315 for future sync with the server instance 120 when direct connection with the server or relay connection with the server via a user device 110 becomes available. Thus, for example, if internet or cellular data access is not available to communication module 320 of sentry 105 when the transaction record is generated, transaction record module 314 will control to mark the transaction record as undelivered and thereby link the transaction to undelivered record data table 317 of storage 315 for syncing with the server instance 120 in the future.

Next, at block 422, if connection to server instance 120 is available, user device 110 also delivers the transaction record generated at block 418 to server instance 120 to store the transaction record on the database of the server instance 120. Thus, if the user device 110 directly delivers the transaction record to server instance 120, and the server instance 120 already has received the transaction record directly from sentry 105, user device 110 will update a flag (e.g., RelayStatus flag) of the transaction record on the local database (block 424) and the transaction record will subsequently be removed from the local storage on user device 110 during background processing. If the user device 110 directly delivers the transaction record to server instance 120, and the server instance 120 has not already received the transaction record directly from sentry 105, user device 110 will update a flag (e.g., RelayedtoServer flag) of the transaction record on the local database (block 424), and the transaction record will be kept in the local storage on user device 110 until a first flag (e.g., DeviceKnowsRelayedToServer flag) and a second flag (e.g., ServerKnowsDeviceKnowsRelayed flag) change to a predetermined status.

Next, at block 426, transaction record module 314 of fuel sentry 105 determines whether or not there are any transaction records that are stored in undelivered record data table 317 that await delivery to the server instance 120. As explained previously, when internet or cellular data connection to server instance 120 is not available to selected sentry 105 that executed the fuel dispensing operation at block 416 and whose transaction record was generated at block 418, transaction record module 314 controls to store the generated undelivered transaction record in undelivered record data table 317 for delivery and synchronization with server instance 120 when connection to the server becomes available, and for relay to the server instance 120 via a user device 110 that connects to sentry 105. Thus, if at block 426, transaction record module 314 of fuel sentry 105 determines that there are no transaction records that are stored in undelivered record data table 317 that await delivery to the server instance 120 (NO at block 426), method 400 performs other processing (block 428), and e.g., waits for another user device connection to perform another fuel dispensing operation.

If, on the other hand, at block 426, transaction record module 314 of fuel sentry 105 determines that there are transaction records that are stored in undelivered record data table 317 that await delivery to the server instance 120 (NO at block 426), method 400 proceeds to block 430 where transaction record module 314 of fuel sentry 105 transmits the transaction records that are stored in undelivered record data table 317 to one or more user devices that may connect with sentry 105 via short-range wireless communication. For example, at block 430, after a first fuel dispensing operation with a first authorized user device 110, if sentry 105 remains in offline mode and a first transaction record corresponding to the first fuel dispensing operation remains undelivered in undelivered record data table 317, when said sentry 105 connects to a second authorized user device, at block 430, transaction record module 314 of fuel sentry 105 transmits the first transaction record to the second authorized user device to attempt to get the first transaction record relayed to the server instance 120.

At block 432, transaction records stored in the local database of one or more user devices 110 are relayed to the server if and when connection to server instance 120 is available. For example, after the first transaction record is transmitted by sentry 105 to second user device 110 (e.g., via Bluetooth) at block 430 while both sentry 105 and second user device 110 are in the offline mode at a remote location where sentry 105 is installed, second user device 110 move to a location that is distant from the remote location of sentry 105 and where connection to server instance 120 becomes available. Thus, after locally storing the first transaction record, when second user device 110 comes back online, and when the fuel sentry application on second user device is running, the fuel sentry application on second user device 110 may, in the background and periodically, check for transactions in its local database that need to be delivered to server instance 120 and relay them to the web service (block 432). For example, if internet or cellular data access is now available to second user device 110 (or to another user device including the user device(s) 110 which generated the transaction record(s) in question, the fuel sentry application of second user device 110 will control to deliver the transaction record that is locally stored on the user device to the server instance 120 via, e.g., a webAPI or SignalR, and the transaction record will be stored on a transaction table on a storage device of server instance 120.

At block 434, user device 110 and/or server instance 120 will update a flag (e.g., RelayedtoServer flag) of the transaction record relayed to server at block 432, and a copy of the transaction record with the updated flag will be stored on server instance 120 and on all user devices 110 that have connection to server instance 120. At block 436, when one of the user devices 110 that has the copy of the transaction record with the updated flag stored in the local database of the user device connects with the fuel sentry 105 via short-range communication (e.g., Bluetooth), transaction record module 314 communicates with the fuel sentry application on the connected user device 110 and updates the flag in the local copy of the transaction record of block 434 that is stored in undelivered record data table 317. At block 438, based on the updated flag at block 436, transaction record module 314 of fuel sentry 105 controls to update another flag (e.g., DeviceKnowsRelayedToServer flag) in the local copy of the transaction record updated at block 436 that is stored in undelivered record data table 317.

At block 440, transaction record module 314 of fuel sentry 105 transmits the transaction records that are stored in undelivered record data table 317 to one or more user devices that may connect with sentry 105 via short-range wireless communication. Thus, at block 440, the local copy of the transaction record that is stored in data table 317 and whose flag (e.g., DeviceKnowsRelayedToServer flag) was updated at block 438 is transmitted to one or more user devices 110 that may connect with sentry 105 for respective fuel dispensing operations. At block 442, when a user device 110, that connected with sentry 105 at block 440 and received the transaction record whose flag (e.g., DeviceKnowsRelayedToServer flag) was updated, is online and is able to communicate with server instance 120, the user device 110 relays this updated flag for the transaction record in question to the server instance to update the flag of the transaction record on the server. At block 444, based on the updated flag at block 442 on the copy of the transaction record on server instance 120, a program module of server instance 120 controls to update yet another flag (e.g., ServerKnowsDeviceKnowsRelayed flag) in the copy of the transaction record on the server.

At block 446, the server instance 120 transmits the transaction record with the updated flag (e.g., ServerKnowsDeviceKnowsRelayed flag) updated at block 444 to one or more user devices 110 that are online and to whom a connection to server instance 120 (e.g., via internet or cellular data) is available. At block 448, a user device that received the transaction record with the updated flag (e.g., ServerKnowsDeviceKnowsRelayed flag) at block 446 from server instance 120 stores the updated transaction record on a local database. At block 450, when one of the user devices 110 that has the updated copy of the transaction record with the updated flag (e.g., ServerKnowsDeviceKnowsRelayed flag) updated at block 448 connects with the fuel sentry 105 via short-range communication (e.g., Bluetooth; while sentry 105 is offline), transaction record module 314 communicates with the fuel sentry application on the connected user device 110 and updates the flag in the local copy of the transaction record (e.g., ServerKnowsDeviceKnowsRelayed flag) stored in undelivered record data table 317. And once the ServerKnowsDeviceKnowsRelayed flag of a given transaction record is updated for the local copy of the transaction record stored in undelivered record data table 317, at block 452, transaction record module 314 of selected sentry 105 controls to archive the local copy of the transaction record updated at block 450 to storage 315, to thereby sync the transaction record to the server and accurately track authorized use of the fuel from the fuel tank being handled by selected sentry 105 even when sentry 105 is offline and cannot connect to server instance 120.

Thus, during the relay communication, if there is a connection available to the server, both the user device and the fuel sentry will attempt to notify the server of the transaction. If there is no available connection to the server, the user device will carry the transaction flagged as undelivered, and the fuel sentry will also maintain a record of the transaction flagged as undelivered to the server. If connection becomes available for either or both fuel sentry and user device, they will report the transaction to the server. If the fuel sentry relays the transaction, it will flag the transaction record as delivered and store it into an archive file. When the user device can communicate with the server, it will deliver the transaction to the server. If the fuel sentry has been able to communicate with the server prior to that, the server will inform the user device that the transaction is known to be on the server by the fuel sentry, and the user device will remove its local copy of the transaction. If the fuel sentry has not delivered the transaction to the server, and the user device is the first, the transaction is stored to the database on the server and flagged as not known to be delivered to the server by the fuel sentry. From that point on, user devices with access to that fuel sentry will receive the unique identity of that transaction. The next time a user device with that unique identity is in range of the fuel sentry or using it, the user device will inform the fuel sentry that the server knows about that transaction. Subsequently, that user device and any other user device working with the fuel sentry will receive that transaction identity flagged as being known as delivered to the server by the fuel sentry. Once a user device is in range of the server, they will notify the server that the sentry knows the transaction as delivered to the server. This will then update each user device in range of server that the server now knows that the sentry knows the transaction as delivered to the server. Once the fuel sentry is notified that the server now knows that the sentry knows the transaction as delivered to the server, the sentry will archive the transaction. From that point on, any user device that connects to the fuel sentry, after negotiating with the fuel sentry will check its list of transactions awaiting relay to the fuel sentry for transactions no longer being reported by the fuel sentry. These transactions will be marked as archived by the fuel sentry. Once this status is relayed by the user device to the server, the server will remove such transactions from its list of transactions to distribute, and the transaction record will go extinct as each user device learns it is redundant and removes it from their local database. Distributed fuel sentry system 100 and corresponding method 400 thus allows fuel sentries 105 in and out of internet service or cellular network to securely update their settings and report transactions via a relay system in or out of communications access to server instance 120.

Fuel sentries 105 may also be configured to directly report any changes in tank level to server 120 when communication access is available. This can help track refueling and add other forensic details to track disbursal. The server can also send out alerts if the fuel level in the tank decreases without authorization of the fuel sentry 105, as would be the case if fuel was illicitly siphoned from the tank. This also allows the user dispensing fuel to monitor the amount of fuel remaining in the tank on the fuel sentry application of the user device.

Figure 7:
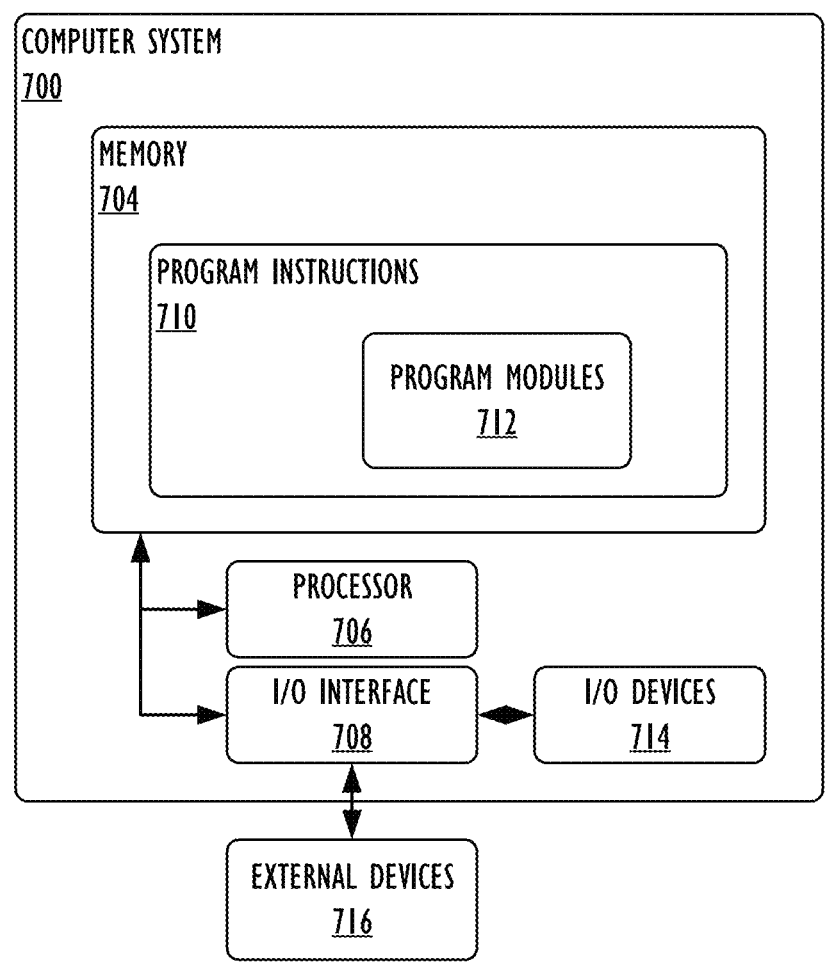
FIG. 7 is a functional block diagram of an exemplary computer system in accordance with one or more embodiments.

FIG. 7 is a functional block diagram of an exemplary computer system (or "system") 700 in accordance with one or more embodiments. In some embodiments, system 700 is a programmable logic controller (PLC). System 700 may include memory 704, processor 706 and input/output (I/O) interface 708. Memory 704 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). Memory 704 may include a non-transitory computer-readable storage medium (e.g., non-transitory program storage device) having program instructions 710 stored thereon. Program instructions 710 may include program modules 712 that are executable by a computer processor (e.g., processor 706) to cause the functional operations described, such as those described with regard to server instance 120, fuel sentry 105, the fuel sentry application on user device 110, program modules 312, dispensing module 313, transaction record module 314, or method 400.

Processor 706 may be any suitable processor capable of executing program instructions. Processor 706 may include a central processing unit (CPU) that carries out program instructions (e.g., the program instructions of the program modules 712) to perform the arithmetical, logical, or input/output operations described. Processor 706 may include one or more processors. I/O interface 708 may provide an interface for communication with one or more I/O devices 714, such as a joystick, a computer mouse, a keyboard, or a display screen (for example, an electronic display for displaying a graphical user interface (GUI)). I/O devices 714 may include one or more of the user input devices. I/O devices 714 may be connected to I/O interface 708 by way of a wired connection (e.g., an Industrial Ethernet connection) or a wireless connection (e.g., a Wi-Fi connection). I/O interface 708 may provide an interface for communication with one or more external devices 716. In some embodiments, I/O interface 708 includes one or both of an antenna and a transceiver. In some embodiments, external devices 716 include line sensor 230.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

What is claimed is:

1. A fuel sentry, comprising:
    a processor;
    storage storing configuration data;
    a communication module; and
    memory operatively coupled to the processor, the storage, and the communication module, the memory comprising instructions that, when executed by the processor, cause the processor to:
    receive, from an external device and via the communication module, a request to perform a fuel dispensing operation on the fuel sentry;
    determine, based on the configuration data stored in the storage, whether a user of the external device is authorized to perform the fuel dispensing operation on the fuel sentry;
    in response to determining that that user is authorized to perform the fuel dispensing operation on the fuel sentry, transmit a notification authorizing the user to begin the fuel dispensing operation;
    transmit, to the external device and during the fuel dispensing operation, first level indicator data indicating a level of fuel remaining in a fuel tank, and second level indicator data indicating an amount of fuel pumped;
    generate a transaction record when the fuel dispensing operation has ended;

deliver the generated transaction record to a server instance deployed on a cloud;

store the transaction record in an undelivered record data table on the storage when the communication module is not in a communication range of a network of the server instance; and relay the transaction record to one or more external devices when the communication module is communicatively coupled to the one or more external devices via short-range wireless communication for relay to the server instance.

2. The fuel sentry according to claim 1, wherein the configuration data includes identification data for each of a plurality of users who are permitted to perform the fuel dispensing operation on the fuel sentry.

3. The fuel sentry according to claim 1, wherein the memory further comprises instructions that, when executed by the processor, cause the processor to:

receive, from the external device, information indicating a unit to be fueled in the fuel dispensing operation; and transmit, based on the configuration data, a list of tanks that have fuel compatible with the indicated unit.

4. The fuel sentry according to claim 3, wherein the configuration data further includes identification data for each of a plurality of units, data indicating a fuel type to be used for each unit, and data indicating a fuel tank capacity for each unit.

5. The fuel sentry according to claim 4, wherein the plurality of units include a plurality of different vehicles or fuel-based work equipment.

6. The fuel sentry according to claim 1, wherein the configuration data includes identification data for each of a plurality of users who are permitted to perform the fuel dispensing operation on the fuel sentry, and data indicating, for each permitted user, a maximum authorized amount of fuel that can be pumped by the user during the fuel dispensing operation.

7. The fuel sentry according to claim 1, wherein the instructions that, when executed by the processor, cause the processor to deliver the generated transaction record to the server instance comprise instructions that, when executed by the processor, cause the processor to:

directly deliver the transaction record to the server instance when the communication module is in a communication range of a network of the server instance; and archive the transaction record on the storage.

8. The fuel sentry according to claim 1, wherein the communication module is configured for short-range wireless communication with the external device.

9. The fuel sentry according to claim 8, wherein the memory further comprises instructions that, when executed by the processor, cause the processor to:

receive a connection request from the external device when the external device is in a communication range of the communication module;

receive updated configuration data from the external device; and replace the configuration data in the storage with the updated configuration data.

10. A fuel dispensing system, comprising:
at least one fuel tank;
a first pump that pumps fuel from the at least one fuel tank; and
a fuel sentry controlling pumping of the fuel from the fuel tank, the fuel sentry comprising:

a processor;
storage storing configuration data;
a communication module; and
memory operatively coupled to the processor, the storage, and the communication module, the memory comprising instructions that, when executed by the processor, cause the processor to:

receive, from an external device and via the communication module, a request to perform a fuel dispensing operation from the at least one fuel tank;

determine, based on the configuration data stored in the storage, whether a user of the external device is authorized to perform the fuel dispensing operation from the at least one fuel tank;

in response to determining that that user is authorized to perform the fuel dispensing operation from the at least one fuel tank, transmit power to the first pump from a power source to allow the user to pump fuel from the at least one fuel tank;

transmit, to the external device and during the fuel dispensing operation, first level indicator data indicating a level of fuel remaining in a fuel tank, and second level indicator data indicating an amount of fuel pumped;

generate a transaction record when the fuel dispensing operation has ended;

deliver the generated transaction record to a server instance deployed on a cloud;

store the transaction record in an undelivered record data table on the storage when the communication module is not in a communication range of a network of the server instance; and relay the transaction record to one or more external devices when the communication module is communicatively coupled to the one or more external devices via short-range wireless communication for relay to the server instance.

11. The fuel dispensing system according to claim 10, wherein the at least one fuel tank comprises a first fuel tank holding a first type of fuel, and a second fuel tank holding a second type of fuel, wherein the system further comprises a second pump, and wherein the first pump pumps fuel from the first fuel tank and the second pump pumps fuel from the second fuel tank, and wherein the memory further comprises instructions that, when executed by the processor, cause the processor to:

determine, based on the configuration data stored in the storage and based on a unit for fueling selected by the user of the external device, a fuel type to be used to perform the fuel dispensing operation for the user; and transmit power to one of the first pump and the second pump to allow the user to pump fuel from one of the first and second fuel tanks that stores the fuel type that is determined to be used to perform the fuel dispensing operation for the user.

12. The fuel dispensing system according to claim 10, further comprising a level sensor disposed with the at least one fuel tank to measure a fuel level and provide tracking of how much fuel is available in the fuel tank.

13. The fuel dispensing system according to claim 10, wherein the at least one fuel tank, the first pump, and the fuel sentry, are mounted on a mobile transport.

14. The fuel dispensing system according to claim 10, wherein the at least one fuel tank, the first pump, and the fuel sentry are fixedly mounted at a worksite as a stationary unit.

15. A method for dispensing fuel, comprising:
receiving, at a fuel sentry and from an external device, a request to perform a fuel dispensing operation;
determining, based on configuration data stored in the fuel sentry, whether a user of the external device is authorized to perform the fuel dispensing operation on the fuel sentry;
in response to determining that that user is authorized to perform the fuel dispensing operation on the fuel sentry, transmitting a notification to the external device authorizing the user to begin the fuel dispensing operation;
generating a transaction record when the fuel dispensing operation has ended;
delivering the generated transaction record to a server instance deployed on a cloud;
storing the transaction record in an undelivered record data table on a storage of the fuel sentry when a communication module of the fuel sentry is not in a communication range of a network of the server instance; and
relaying the transaction record to one or more external devices when the communication module is communicatively coupled to the one or more external devices via short-range wireless communication for relay to the server instance.

16. The method according to claim 15, wherein the configuration data includes identification data for each of a plurality of users who are permitted to perform the fuel dispensing operation on the fuel sentry.

17. The method according to claim 15, further comprising:
receiving, from the external device, information indicating a unit to be fueled in the fuel dispensing operation; and
transmitting, based on the stored configuration data, a list of tanks that have fuel compatible with the indicated unit.

18. The fuel sentry according to claim 17, wherein the configuration data further includes identification data for each of a plurality of units, data indicating a fuel type to be used for each unit, and data indicating a fuel tank capacity for each unit.

19. The method according to claim 15, wherein delivering the generated transaction record to the server instance comprises:
directly delivering the transaction record to the server instance when a communication module of the fuel sentry is in a communication range of a network of the server instance; and
archiving the transaction record to a storage of the fuel sentry.

20. The method according to claim 15, wherein the transaction record includes GPS location data of the fuel sentry, GPS location data of the external device, identification data of the user, identification data of the fuel sentry, identification data of a fuel tank, identification data of a unit fueled, pumping activity data, and one or more flags for relay communication when the fuel sentry cannot directly deliver the transaction record to the server instance.

21. The method according to claim 15, further comprising:
receiving, at the fuel sentry, a connection request from the external device when the external device is in a short-range wireless communication range of the fuel sentry;
receiving, at the fuel sentry, updated configuration data from the external device; and
replacing the configuration data stored in a storage of the fuel sentry with the received updated configuration data.

* * * * *